US012618958B2

(12) United States Patent
    Oswald

(10) Patent No.:   US 12,618,958 B2
(45) Date of Patent:        May 5, 2026

(54) RADAR SYSTEM AND ASSOCIATED APPARATUS AND METHODS

(71) Applicant: Gordon Kenneth Andrew Oswald, Whitby (GB)

(72) Inventor: Gordon Kenneth Andrew Oswald, Whitby (GB)

( * ) Notice: Subject to any disclaimer, the term of this patent is extended or adjusted under 35 U.S.C. 154(b) by 273 days.

(21) Appl. No.: 18/688,145

(22) PCT Filed: Sep. 1, 2022

(86) PCT No.: PCT/GB2022/052239

§ 371 (c)(1),
(2) Date: Feb. 29, 2024

(87) PCT Pub. No.: WO2023/031614

PCT Pub. Date: Mar. 9, 2023

(65) Prior Publication Data

US 2024/0377519 A1      Nov. 14, 2024

(30) Foreign Application Priority Data

Sep. 1, 2021    (GB) .................................. 2112454.0

(51) Int. Cl.
    *G01S 13/04*        (2006.01)
    *G01S 7/282*        (2006.01)
                    (Continued)

(52) U.S. Cl.
    CPC .............. *G01S 13/04* (2013.01); *G01S 7/282* (2013.01); *G01S 7/288* (2013.01); *G01S 7/292* (2013.01)

(58) Field of Classification Search
    CPC .................................................. G01S 13/5248
    See application file for complete search history.

(56) References Cited

U.S. PATENT DOCUMENTS 3,964,064 A       6/1976   Brandao et al.
5,235,338 A   *   8/1993   Hsiao .................. G01S 13/5248
                                                    342/162

(Continued)

FOREIGN PATENT DOCUMENTS

EP         0 509 842 A2     10/1992
EP         0 615 137 A2      9/1994
GB         1 167 671 A      10/1969

OTHER PUBLICATIONS

R. Zhang, G. Li and Y. D. Zhang, "Micro-doppler interference removal via histogram analysis in time-frequency domain," in IEEE Transactions on Aerospace and Electronic Systems, vol. 52, No. 2, pp. 755-768, Apr. 2016, doi: 10.1109/TAES.2015.150112. (Year: 2016).*

(Continued)

*Primary Examiner* — Bernarr E Gregory
(74) *Attorney, Agent, or Firm* — Merchant & Gould P.C.

(57)                     ABSTRACT

A radar system includes a radar receiver configured to receive return signals reflected from within a volume of radar coverage. A processor for processing the return signals extracts characteristics from a return signal received in a corresponding coherent processing interval. The extracted characteristics include a set of frequencies and/or a set of times, each frequency and/or time having a respective extracted amplitude of a corresponding set of extracted amplitudes. The processor determines a corresponding amplitude index for each extracted amplitude; and for each extracted amplitude, respectively stores in a memory location addressable via the corresponding amplitude index, a set of return signal related data including information for identifying the corresponding frequency and/or time, and an (Continued)

associated identifier for uniquely identifying, in combination with the amplitude index, that set of return signal related data.

20 Claims, 16 Drawing Sheets

(51) Int. Cl.
*G01S 7/288* (2006.01)
*G01S 7/292* (2006.01)

(56) References Cited

U.S. PATENT DOCUMENTS

| | | | | |
|---|---|---|---|---|
| 5,436,847 | A | 7/1995 | Schroer et al. | |
| 5,448,245 | A * | 9/1995 | Takase ..................... | G01S 7/292 |
| | | | | 342/204 |
| 8,730,090 | B2 * | 5/2014 | Nakahama .............. | G01S 7/414 |
| | | | | 342/26 B |
| 9,594,159 | B2 * | 3/2017 | Wang ....................... | G01S 7/414 |
| 2010/0066598 | A1 | 3/2010 | Sherman et al. | |
| 2010/0073218 | A1 * | 3/2010 | Stockmann ........... | G01S 7/2923 |
| | | | | 342/146 |

OTHER PUBLICATIONS

United Kingdom Search Report issued in corresponding United Kingdom Application No. 2112454.0, Feb. 25, 2022.

* cited by examiner

| Signal aspect | Associated features | Classification |
|---|---|---|
| Noise | Normal distribution | Functional cell; derived noise boundary |
| Surplus signal energy | | Active cell registration |
| Low-Doppler clutter peaks | Phase noise | Phase noise > suppression |
| Increased channel noise | | Channel suppression |
| Time-varying beam noise | | Interference requiring suppression |
| Unique spectrum bounds | Doppler variations | Candidate target |
| Contiguous spread Doppler | | Target dynamics |
| Doppler spurs | Matched multiples | Target rotor features |
| Neighbouring cell registrations | Matching satellites | Multipath propagation |

RADAR SYSTEM AND ASSOCIATED APPARATUS AND METHODS

This application is a National Stage Application of PCT/GB2022/052239, filed Sep. 1, 2022, which claims benefit of United Kingdom Application 2112454.0, filed Sep. 1, 2021, and which applications are incorporated herein by reference. To the extent appropriate, a claim of priority is made to each of the above disclosed applications.

FIELD OF THE INVENTION

The present invention relates to a radar system and to associated apparatus and methods. The invention has particular, although not exclusive, relevance to air surveillance radar.

BACKGROUND TO THE INVENTION

Radar for air surveillance has taken many forms, with a range of functions, from long-range air defence to terminal traffic control. For example, types of radar and corresponding applications include:

Staring air defence: Range and Direction Finding
Scanning air defence and traffic control: Detect and Track with reflecting or phased array antennas, plus cooperative methods.
Tracking air defence: Non-cooperative Detect and Track
Active Electronically Scanned Array (AESA) air defence and weapons control: Resource Management, Non-Cooperative Detect and Track Phased array radars are built with solid-state electronics using radio-frequency phase control between the elements of a planar array antenna to form and direct transmit/receive beams, and these are then used in place of parabolic reflectors to support electronic scanning, and with the added potential of target-following modes.

AESA radars use a large number of transmit-receive modules to carry out an E-scan function, but with greater flexibility and agility in directing and receiving beams, and of achieving multiple functionality within an array antenna. AESA radars have been the main focus of radar system development in recent decades. However, the demands of agile beam forming, agile waveforms and multiple functions place major and competing demands on the management of radar resources, such as dwell times and the available processing power.

Radar engineering design has focused on minimizing the width of scanning beams for azimuth accuracy combined with high sensitivity, on the basis that the arising data must be accurate, detection fast, and the processing burden small. Track filtering has the task of receiving a series of detected positions, with many targets, each being interrogated only once every several seconds; the task being, first, to form correct associations between successive detections, and then to estimate target-specific trajectories from their positions. The probability of false associations and the arising processing burden grows rapidly with the number of targets, their dynamics, and the length of the scan interval.

High radar agility, while effective in allowing random and rapid changes in beam direction, runs counter to potential gains that arise from extended dwell times on target.

Scanning beams with high detection thresholds incur losses in signal information when the beam is narrowly focused elsewhere in the volume of regard, when signal components fail the threshold test and when short dwell times lead to low-resolution Fourier transforms and Doppler spectra. Intermittent observation is a necessary feature of scanning radar and implies the need to find associations between time-separated detections, which in turn leads to volatile and factorial-scaled burdens in computation. By contrast, persistent observation eliminates or greatly reduces the likelihood of disassociation between successive target scatters: signal sequences can be processed linearly, maintaining and extracting the full information content.

Extended dwell time increases routine processing costs, but it permits the acquisition of continuing, coherent target responses, yielding target data with greater resolution and information content than is possible within the short dwell time typical of a scanning radar.

Radar Target Information

Information acquired by surveillance is created not by calculations at the radar, but when radar transmissions are scattered from objects in the volume of regard. Complex scattered amplitudes are encoded according to the presence, position, shape and motion of the object. The continuing reception of scattered signals acquires information about every object in the volume of regard and its behaviour that, according to the Electromagnetic Uniqueness Theorem is uniquely decodable within the constraints of radar sensitivity and resolution, Tracking is then implicit in the solution.

An important fundamental in radar is that, provided that signal processing is linear with respect to complex (in-phase and quadrature) signal amplitudes, any information content is maintained. This is also true with respect to the addition of noise in receiver electronics, in that while random noise may obscure target information, it does not degrade or confuse it: it remains available for association with information at neighbouring times and receiving array elements. Additive noise itself provides a stable reference signal distribution in the absence of received signals.

The invention implements the EUT in the acquisition and interpretation of radar signal information by the provision and use of data structures termed 'vector histograms' below, by means of which continuity and coherence are maintained in target signal information.

Ubiquitous Radar

So-called 'Ubiquitous radar' has the ability to form multiple beams and perform multiple simultaneous functions for various applications. Transmission is omnidirectional within the VoR and directions of reception are determined by digital beamforming between the elements of a receiving array, forming multiple range/azimuth/elevation resolution cells. This type of radar is operable to detect targets in all directions without mechanically or electronically scanning matched transmitting and receiving beams, and to select and maintain target dwell times for different surveillance applications. However, progress towards wide use of ubiquitous radar has been slow. This is in part because its multibeam structure demands high processing capacity. As with other radars, to accommodate this processing demand, high detection thresholds are used to exclude all but the amplitude peaks of received signals after preliminary filtering. However, many aspects of radar targets and their trajectories are encoded within signals at amplitudes below these peaks.

A ubiquitous radar aperture receives information from all objects within its Volume of Regard, some of which relates to targets of interest, and only some of which is threshold-detectable in the presence of random noise introduced by receiving electronics. Ubiquitous radar continually interrogates its volume of regard, generating large volumes of information, encoded within signal sequences scattered by each target, and requiring extensive processing capacity, to allow the objects to be analysed.

Ubiquitous radar persistently transmits radio signals at one or more known frequencies at a known power and with a known, coherent pulse waveform, repeated at known pulse repetition intervals, to simultaneously irradiate a volume of regard. Signals are then scattered from metallic or dielectric targets or clutter objects within the volume of regard according to Maxwell's equations and Huygens' Principle. The ubiquitous radar is equipped with a receiving aperture containing multiple receiving antenna elements, each of which receives a small fraction of the scattered signal energy. The radar acquires sequences of signal data at each element, and makes complex amplitude and delay measurements of these signals. Coherent Processing Sequences (CPS) are received during a coherent processing interval ($T_{CPI}$: also known as 'dwell time' or 'integration time'), form the spatial resolution cells that together make up the volume of regard, yield time sequences and Doppler spectra, and determine the status and significance of the signal content for each cell and CPS. Complex amplitudes (with In-phase and quadrature components) provide for coherent processing for each resolution cell, and determine scalar extracted signal amplitudes in the processes described below.

Well-known processes such as Fourier Transforms and complex weighted vector sums in time and space are applied to successive sequences of received scattered signal fractions. Since the ubiquitous radar continually interrogates the volume of regard and generates large volumes of information, the processing capacity required to process and analyse the returned signals is large. Performance risks arise from extended dwell times with target dynamics, from Doppler components related to moving components of the target, from multipath propagation within a wide volume of regard, and from forming correct associations between many detected targets. Parallel processing techniques may be used to form the spatially-resolved cells, achieve amplitude gain for the signal, and to deliver target solutions. The use of high detection thresholds may constrain the processing load, but can also cause volatile fluctuations in the processing power requirements of the system, decreasing the efficiency of the parallel-processing implementation.

Ubiquitous radar may treat each successive sequence of received signal information independently and deliver the required detection performance in terms of the signal to noise ratio achievable from each sequence, using coherent or incoherent integration. The task of sensitive detection and accurate positioning is enabled for ubiquitous radar by very many narrow receiving beams. However, to maintain low false alarm rates, high detection thresholds are used, resulting in a large amount of signal data being discarded. This discarded data may contain valuable information about a target of interest, especially where target signatures comprise components of different and varying amplitudes.

There is a need, therefore, for a radar system that combines the benefits of ubiquity and continuity of observation, but which maintains high sensitivity to target signal information and allows for efficient processing of the received signals.

SUMMARY OF THE INVENTION

The present invention seeks to provide a radar system, associated methods and apparatus, data structures and programs for addressing, or at least partially ameliorating, the above issues.

In a first aspect, the invention provides a radar system for providing surveillance, the radar system comprising: at least one radar transmitter and at least one radar receiver arranged to provide a volume of radar coverage, wherein the at least one radar transmitter is configured to transmit a sequence of pulses to illuminate the volume of radar coverage, wherein the at least one radar receiver is configured to receive corresponding return signals reflected from within the volume of radar coverage, and wherein the return signals are received in a series of coherent processing intervals; and means for processing the return signals, wherein the means for processing the return signals is configured to: extract characteristics from signal received in coherent processing interval, the extracted characteristics comprising a set of frequencies and/or a set of times, each frequency and/or time having a respective extracted amplitude of a corresponding set of extracted amplitudes; determine a corresponding amplitude index for each of extracted amplitudes; and for each extracted amplitude: respectively store, in association with the corresponding amplitude index (e.g., in a memory location addressable via the corresponding amplitude index), a set of return signal related data comprising information for identifying the corresponding frequency and/or time, and an associated identifier for uniquely identifying, in combination with the amplitude index, that set of return signal related data.

The associated identifier may be an integer that is incremented for each successive set of return signal related data stored in association with the corresponding amplitude index. The extracted characteristics, extracted amplitudes, amplitude indices and the return signal related data form an addressable data structure in computer memory, referred to below as a Vector Histogram. The unique character of the Vector Histogram is that, for each resolution cell and CPS, the extracted amplitude indices that form data addresses in memory do not require explicit threshold tests within a software process, They thereby avoid unpredictable factorial expansion of the burden of associations.

The means for processing the return signals may be further configured to access a stored set of return signal related data by using the corresponding amplitude index as at least part of an address, and optionally the associated identifier for uniquely identifying the set of return signal related data as part of the address.

The extracted characteristics may comprise the set of frequencies and the set of extracted amplitudes may comprise the corresponding amplitudes in the frequency domain. The set of return signal related data may comprise a frequency from the extracted set of frequencies.

The extracted characteristics may comprise the set of times and the set of extracted amplitudes may comprise the corresponding amplitudes in the time domain. The set of return signal related data may comprise a time from the extracted set of times. The at least one radar transmitter may be configured to transmit the sequence of pulses omnidirectionally.

The amplitude index, the set of return signal related data, and the associated identifier for uniquely identifying, in combination with the amplitude index, the set of return signal related data may be stored in association with one another in a vector histogram.

The set of return signal related data may comprise at least one of an associated time, frequency, phase, complex amplitude, radial speed, and/or acceleration.

The set of return signal related data may be stored as a vector that can be identified using the corresponding amplitude index, and optionally the associated identifier for uniquely identifying, in combination with the amplitude index, the set of return signal related data.

The means for processing the return signals may be further configured to extract a further characteristic including at least one of a position, heading, speed, acceleration, altitude, scattering cross-section, and/or classification of an object within the volume of radar coverage based on the stored set of return signal related data.

The means for processing the return signals may be further configured to update the stored set of return signal related data to include the extracted further characteristic. The object may be a target in the volume of radar coverage (for example, an aircraft).

The means for processing the return signals may be further configured to identify the presence of a target (for example, an aircraft) within the volume of radar coverage based on the stored set of return signal related data.

The means for processing the return signals may be configured for parallel processing of the return signals and/or for parallel processing of the set of return signal related data.

The volume of radar coverage may comprise a plurality of radar cells; and the means for processing the return signals may be configured to classify, based on the set of return signal related data, a return signal received from a cell of the plurality of cells as at least one of: a noise signal corresponding to noise at the at least one radar receiver; a clutter signal; a target signal corresponding to an object of interest in the volume of radar coverage; a multipath signal corresponding to multipath scattering; an interference signal; or a malfunction signal corresponding to a malfunction of the radar system. The at least one radar receiver comprises a plurality of radar receiver elements and/or comprises a plurality of radar receivers; and the at least one radar receiver may be configurable for digital beamforming to form the plurality of radar cells.

The means for processing the return signals may be further configured for identifying a modulation spur, and/or for identifying at least one rotating component of an object such as a rotor, propeller, jet engine, or wind turbine blade from the set of return signal related data.

The means for processing the return signals may be further configured to determine an acceleration of an object from the set of return signal related data, and the determination may be based on contiguous amplitudes in the frequency domain.

The means for processing the return signals may be further configured to determine at least one of an associated range, amplitude, direction and/or Doppler offset of simultaneous and coherent received signals, to identify multipath return signals using the set of return signal related data.

The extracted characteristics may comprise the set of times and the set of extracted amplitudes may comprise the corresponding amplitudes in the time domain, and the means for processing the return signals may be further configured to identify, from the set of return signal related data, repetitive dynamic radar clutter (e.g. a wind turbine blade).

The amplitude index may correspond to a range of amplitudes in which the corresponding extracted amplitude falls.

Determining the amplitude index may comprise compressing the corresponding extracted amplitude and determining an amplitude index corresponding to the compressed extracted amplitude.

Compressing the corresponding extracted amplitude may comprise calculating a root (e.g. a square or cube root) of the corresponding extracted amplitude.

The radar system may be for providing air surveillance. The at least one radar transmitter may be configured to transmit the sequence of pulses to persistently illuminate the volume of radar coverage.

The means for processing the return signals may be configured without reference to a significant amplitude threshold (e.g. a threshold that is greater than an average expected noise amplitude), determine the amplitude index, and without reference to a significant amplitude threshold (e.g. a threshold that is greater than an average expected noise amplitude) store, in association with the corresponding amplitude index, the set of return signal related data comprising information for identifying the corresponding frequency and/or time, and the associated identifier for uniquely identifying, in combination with the amplitude index, that set of data.

The means for processing the return signals may be configured to determine the amplitude index, and store, in association with the corresponding amplitude index, the set of return signal related data comprising information for identifying the corresponding frequency and/or time, and the associated identifier for uniquely identifying, in combination with the amplitude index, that set of data, irrespective of the values of the extracted amplitudes.

The information for identifying the corresponding frequency may be a Doppler frequency index.

In a second aspect the invention provides a method of a radar system for providing surveillance, the method comprising: transmitting a sequence of pulses to illuminate a volume of radar coverage, receiving corresponding return signals reflected from within the volume of radar coverage, wherein the return signals are received in a series of coherent processing intervals; processing the return signals is configured to: extract characteristics from a return signal received in a corresponding coherent processing interval, the extracted characteristics comprising a set of frequencies and/or a set of times, each frequency and/or time having a respective extracted amplitude of a corresponding set of extracted amplitudes; determine a corresponding amplitude index for each extracted amplitude of the set of extracted amplitudes; and for each extracted amplitude: respectively store, in association with the corresponding amplitude index, a set of return signal related data comprising information for identifying the corresponding frequency and/or time, and an associated identifier for uniquely identifying, in combination with the amplitude index, that set of return signal related data.

In a third aspect the invention provides a computer programming method or product comprising instructions which, when the program is executed by a computer, cause the computer to carry out the steps of the method of the second aspect.

Beneficially, the system of the present disclosure utilises unconditional processing of the obtained data. Therefore, in comparison to conventional radar system processing in which a detection threshold is used to filter the received signals, the system of the present disclosure is able to retain a larger amount of target information, including information that would otherwise be discarded due to falling below the threshold of a conventional system. This enables the system of the present disclosure to analyse low-amplitude target signature characteristics.

Beneficially, whilst the unconditional processing of the system of the present disclosure increases the amount of data to be stored and processed, the processing load required to process and analyse the received signals is more predictable. Therefore, the processing of the present disclosure is more suitable for implementation in a system utilising parallel processing. In contrast parallel processing capabilities are difficult to implement in systems that utilise the single-threshold tests and intermittent target interrogations of conventional radar systems. This is because threshold tests can result in data-dependent and volatile processing burdens.

Beneficially, by processing and storing the received data in the vector histogram, the data for each cell can be efficiently processed and analysed to identify matches, differences or correlations between signal components in the time or frequency domains. Moreover, storing the associated data in the vector histogram allows for efficient addressing of the data and direct data manipulation, for example to identify Doppler spur indices that are equally separated from an airframe peak index.

BRIEF DESCRIPTION OF THE DRAWINGS

Embodiments of the invention will now be described by way of example only with reference to the attached figures in which:

FIG. 5 shows a table of signal aspects and the corresponding associated features and classifications;

FIG. 9 shows a more detailed view of the histogram of FIG. 8;

TERMINOLOGY AND ABBREVIATIONS

Figure 1:
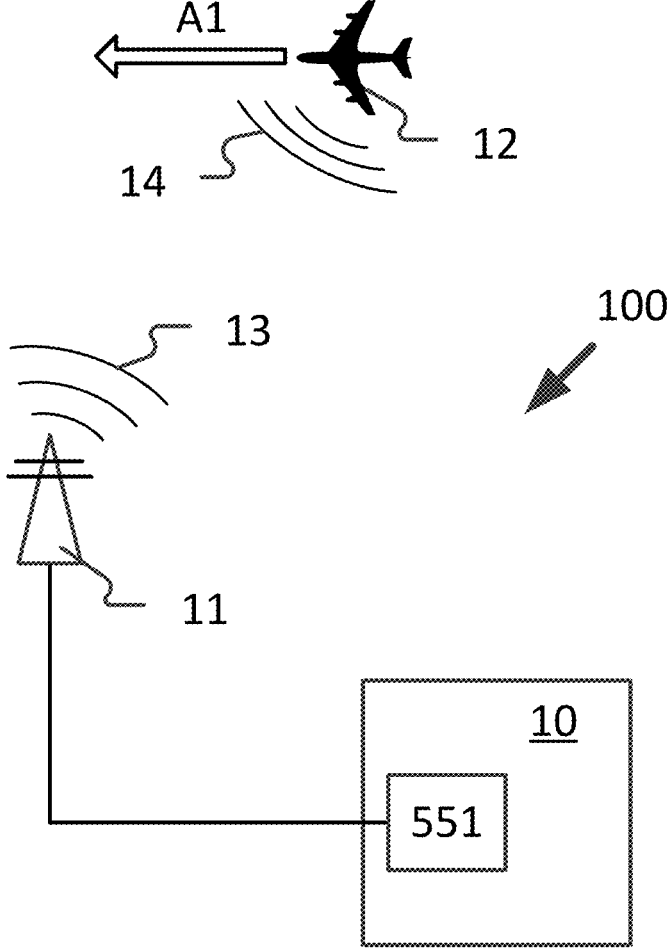
FIG. 1 shows a simplified schematic overview of a radar system.

The following terms and abbreviations are used throughout this disclosure:

Amplitude Index—Index of amplitude intervals for Vector Histogram format

Associated Identifier—identification string for sets of radar return signal related data CFAR—Constant False Alarm Rate threshold setting.

Clutter—EM scatter arising from objects within the volume of regard that do not conform with a predetermined definition of targets of interest.

CPI—Coherent Processing Interval during which signal data are assembled and processed as complex amplitudes.

Coherent Processing Sequence (CPS)—A series of pulses used as the basis for accurately-timed or frequency-transformed measurements.

Data structure—Associated set of directly-addressable memory locations and arrays.

EM scatterer—A metallic or dielectric object that when irradiated by an electromagnetic wave causes energy in the wave to be redirected in spatial directions other than that of the irradiation.

Newtonian targets in motion—EM scatterers that have continuing existence within a Volume of Regard over an extended time and execute dynamic trajectories that deviate from a linear and regular sequence of positions by less than one quarter wavelength between pulse intervals, maintaining continuity in size, shape, mass and material properties.

Nyquist—compliant-Extended Nyquist criteria provide that:

(1) any waveform sampled for unambiguous digital processing contains no sinusoidal frequencies beyond one half of the sampling rate, or (2) for sampling with a constant ambiguity factor the number of cycles of the sinusoid between samples shall not change by more than one half during the sampling interval.

For example, for radial target speed of 250 m/s and radar wavelength 0.2 m, the Doppler frequency will be 2500 Hz. For a sample rate of 1000 Hz, 2.5 cycles or a phase change of 900 degrees will occur between samples. To change this to 2 or 3 cycles between samples, the speed must decrease to 200 m/s or increase to 300 m/s within 0.001 second, requiring acceleration of 50,000 m/s$^2$ or 5,000 G; an explosive event in which the Newtonian integrity of the object will be lost.

Resolution cells—Spatial volumes within a Volume of Regard resolved by the radar in range, in azimuth and in elevation.

Satellite targets—scattered signals that arise from targets of interest but whose propagation to and/or from the radar includes a reflection or scattering event occurring at a source of clutter.

Specified performance—Includes, but is not limited to: minimum and maximum range, azimuth extent, elevation extent, range, azimuth and elevation resolution and accuracy, maximum and minimum target cross-section, maximum and minimum report interval, maximum number of targets, maximum rate of false reports, minimum target classification metrics.

Target capture—selection of EM scatterers that meet the specification for target reporting in terms of, for example, radar cross-section, position in range, azimuth and elevation, speed and acceleration, and classification requirements.

Target information—Includes, but is not limited to: measures of the target dimensions and airframe features, the position, the orientation, and the motion of EM scatterers in the VoR.

Target modulation spurs—Doppler signals associated with aircraft targets, which represent modulations of the target signal due to, for example, the rotation of rotors or propellers.

Target Satellite Returns (TSR)—Returns arising from propagation via scattering or reflection by clutter surfaces or structures.

Volume of Regard (VOR)—The field of view of a ubiquitous radar.

DETAILED DESCRIPTION

FIG. 1 shows an overview of a radar system 100 for air surveillance. The system 100 includes a control unit 10 and a radar transceiver 11. A target 12 (in this example, an aircraft), travelling in a direction indicated by arrow A1 is also shown. The control unit 10 is operable to control the transceiver 11, via a radar transceiver interface 551, to transmit signals 13 and to receive signals 14 reflected from the target.

The control unit is also operable to perform processing of the received data to determine one or more characteristics of the target. For example, the control unit 10 may be operable to determine a speed, acceleration, target type (e.g aircraft type), heading and/or altitude of the target.

It will be appreciated that the transceiver may comprise at least one discrete transmitter and at least one discrete receiver. Moreover, the system may comprise a plurality of receivers (e.g. a receiver array) that are co-located with the transmitter(s), and/or may comprise a plurality of remote receivers located away from the transmitter(s).

As described in more detail later, subsequent processing performed by the control unit 10 may be based on the received amplitude, timing, Doppler frequency and phase observed by the radar at each range, azimuth and elevation. A track filter may determine, for successive coherent processing sequences (or, for a scanning radar, successive scans), which detections are mutually associated and calculates a probable target trajectory.

A method for processing the received signal values and distributions is to assemble a 'histogram' of the received signal amplitudes. The sum of the bin counts of the histogram is equal to the number of signal samples, and the nature of the signal can be assessed by the form of the distribution. FIGS. 2a to 4b show a number of exemplary signal forms and their associated histograms.

Figure 2A:
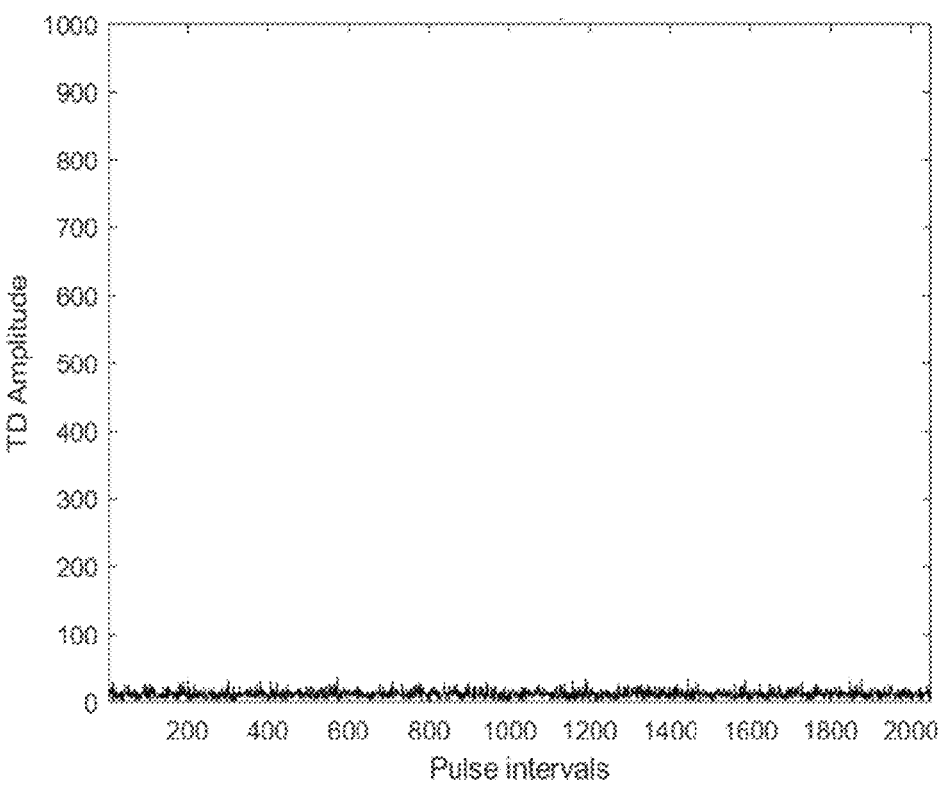
FIGS. 2a and 2b show a noise amplitude graph and a corresponding histogram in the time domain, respectively.
Figure 2B:
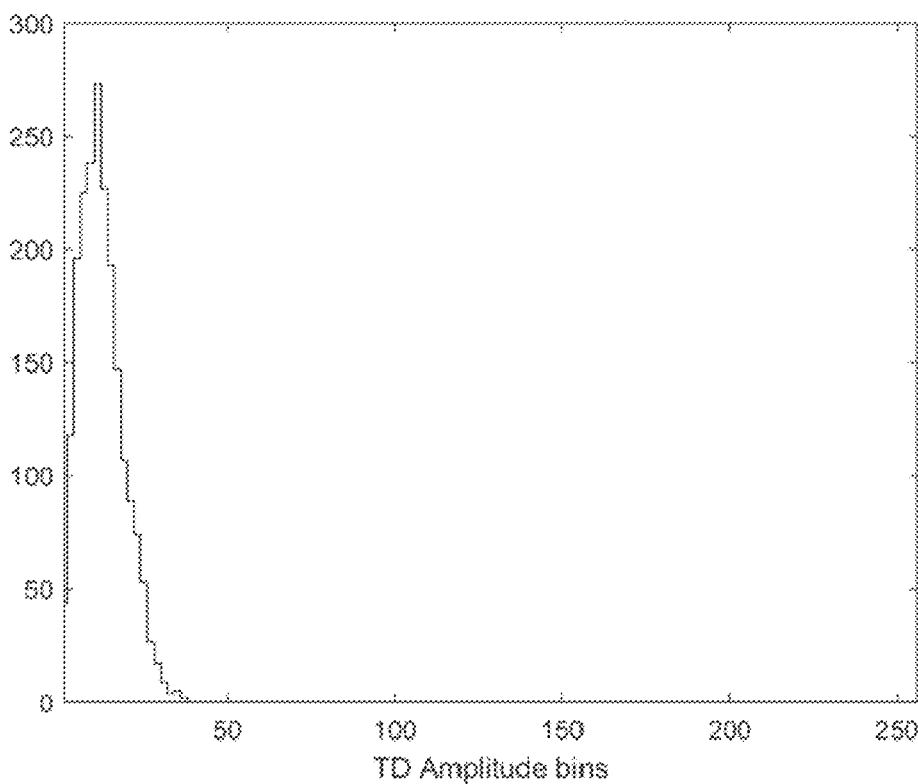

FIG. 2a illustrates random receiver noise in the time domain, and FIG. 2b shows the corresponding amplitude histogram. In this example, the noise amplitude is approximately a Rayleigh distribution. As illustrated in FIG. 2b, for the case of random noise at the receiver, the distribution is dominated by a large number of low amplitude samples.

Figure 3A:
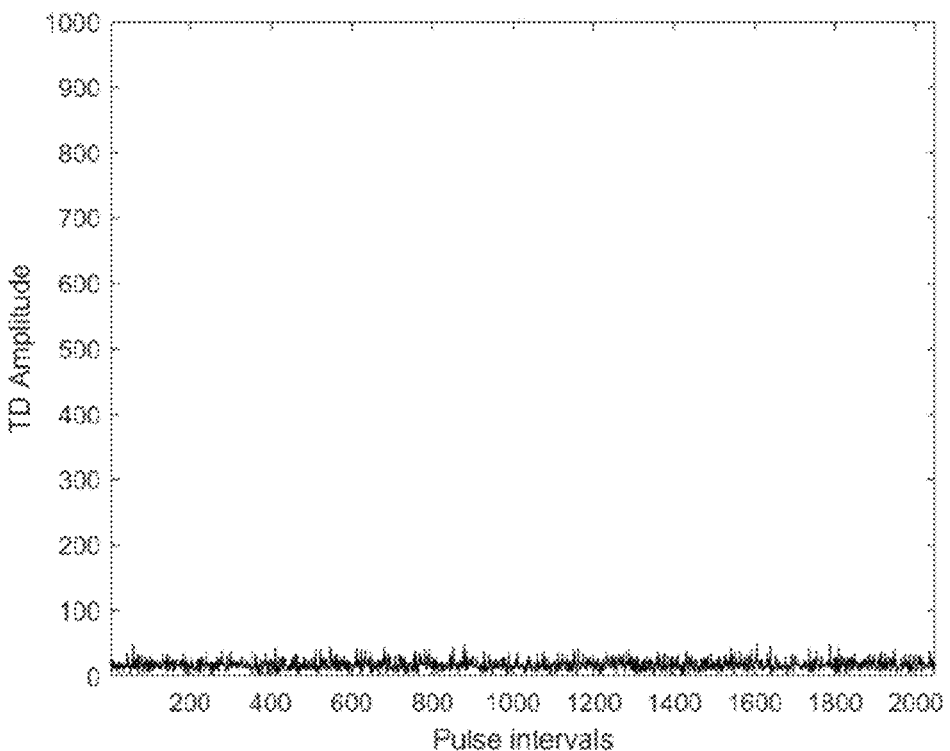
FIGS. 3a and 3b show a signal corresponding to noise plus small sinusoidal signal, and a corresponding histogram in the time domain, respectively.
Figure 3B:
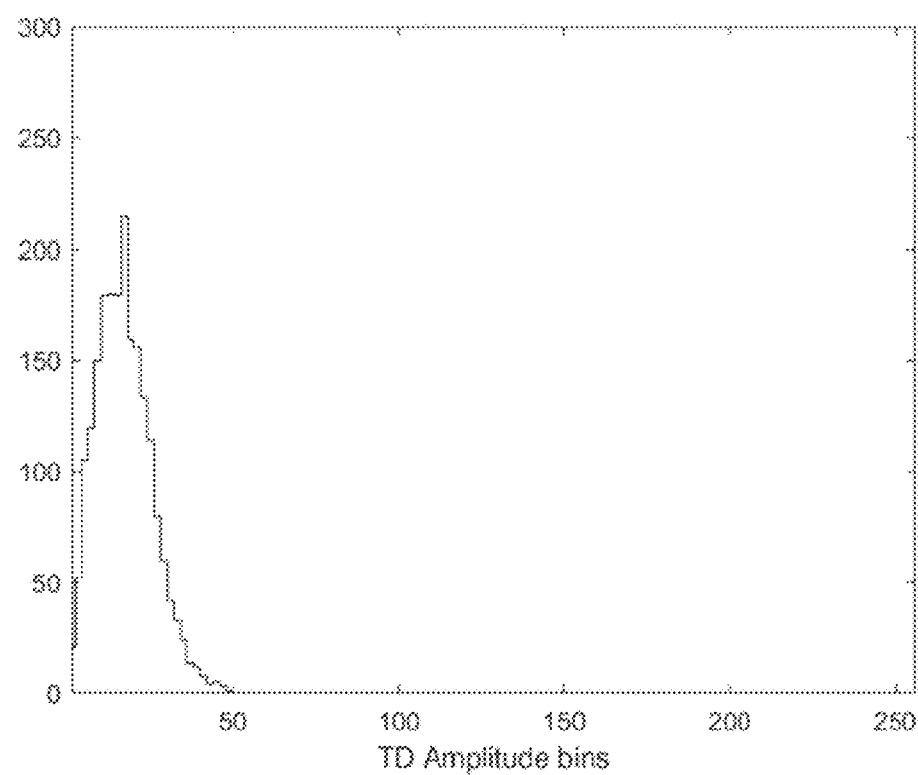

FIG. 3a illustrates the noise of FIG. 2a but with a small sinusoidal signal (corresponding to a target) added, and FIG. 3b shows the corresponding amplitude histogram. In the histogram illustrated in FIG. 3b, the target signal is obscured by the random noise.

Figure 4A:
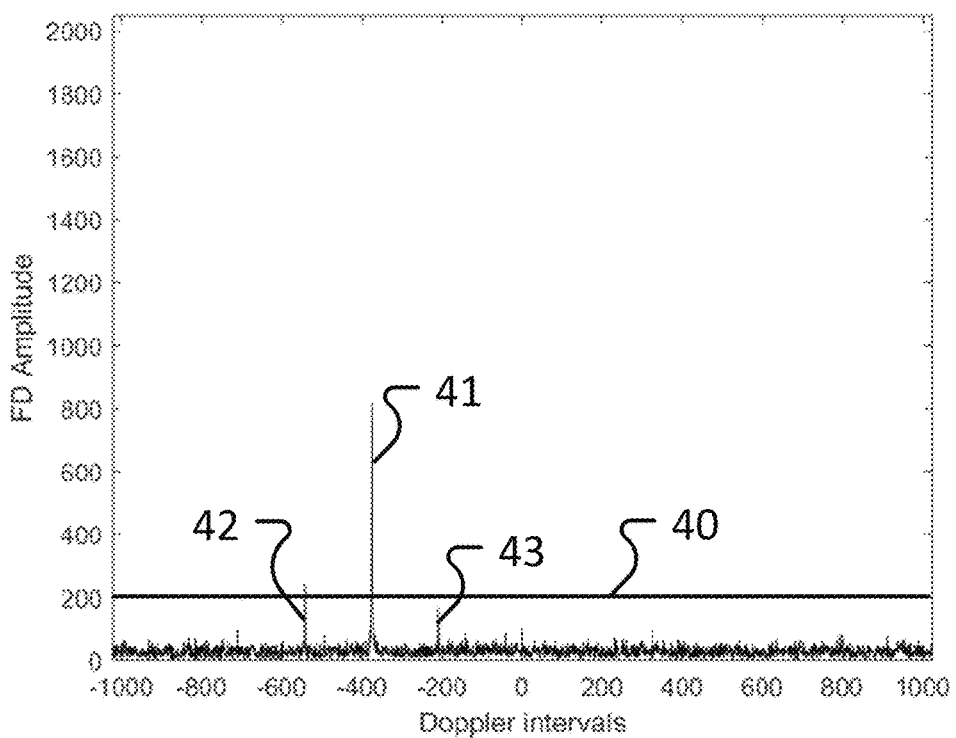
FIGS. 4a and 4b show a spectrum amplitude graph corresponding to the data shown in FIG. 3a, and a corresponding histogram in the frequency domain, respectively.

FIG. 4a shows the data of FIG. 3a after Fourier transformation, with a superposed threshold at 10 times the mean scalar noise amplitude indicated by the solid horizontal line 40. The threshold may be a data-dependent detection threshold (for example, set at a predetermined multiple of the average noise level) that is calculated to yield a predetermined false alarm rate (CFAR) based on the distribution of current or recent independent but neighbouring or historical series of amplitudes. Each amplitude in the current series is then tested against the calculated threshold. Detected signals are submitted for association and tracking, and detection failures are discarded.

Figure 4B:
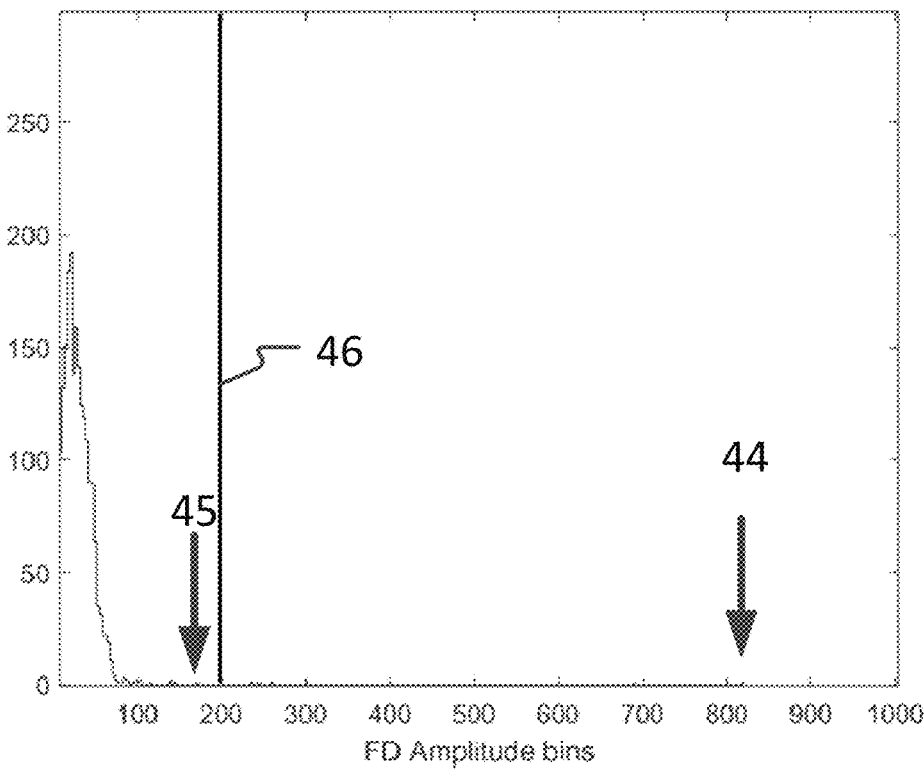

A main peak 41 corresponding to the Doppler-shifted return from an airframe can be seen in FIG. 4a. Two side-peaks 42, 43 can also be seen. The side-peaks, or 'spurs', correspond to rotor modulations (for example, of a propellor). Such spurs may be generated due to movement of the blades of a rotating propeller away from, and towards, the transmitter of the radar system. Notably, whilst the amplitude of one of the spurs 42 exceeds the predetermined threshold, the other spur 43 falls below the detection threshold, and the corresponding signal information is lost in conventional threshold-based radar signal processing. FIG. 4b shows the corresponding amplitude histogram, which also shows the threshold (indicated by the solid vertical line 46). A single occurrence corresponding to the main peak 41 of FIG. 4a is indicated in FIG. 4b by the arrow 44. It is clear from FIG. 4b, that the majority of the acquired data falls below the detection threshold 46, including data relating to one of the spurs (indicated by the arrow 45) and would be discarded in conventional radar signal processing.

Ubiquitous radar generates many resolution cells and large volumes of information, and necessitates large processing capacity for beamforming. Signal data are generated for each resolution cell and CPI. Some of the information may relate to targets of interest, and the process of identifying associations in space and time between all measurements leads to decisions as to which represent target trajectories. For scanning radar or for non-holographic ubiquitous radar, the burden of threshold-conditional target and track processing and reporting varies unpredictably in proportion to the factorial product of the number of plots being tested for association.

Holographic Radar

The examples described in the present disclosure relate to a so-called 'Holographic Radar' although it will be appreciated that other, non-holographic, radar systems may benefit from the techniques described. Holographic radar in the present disclosure is a radar system, based on ubiquitous radar, that continually acquires whole signal data to nonconditionally measure activity in each resolution cell. The system is operable to classify the received signals in terms of noise, clutter, interference or target, capture the presence of targets of interest with characteristics of Newtonian objects, and maintain and update target trajectories and classifications. Beneficially, the system does not exclude from downstream processing target-encoded signal information that would not pass a conventional CFAR threshold.

Holographic radar may regard a finite azimuth and elevation sector, in which case its receiving antenna is typically a flat array. Alternatively, it may regard a volume covering 360 degrees in azimuth and up to 90 degrees in elevation, in which case its transmitter is omnidirectional and its receiver may be a multi-facet, cylindrical or conical array, offering both regular beam spacing and azimuth resolution.

The holographic radar described transmits a persistent series of coherent irradiating signals and receives fractions of each scattering event for Newtonian targets, each assumed to follow a smooth trajectory for a finite duration in the volume. The significance of each new sequence of received signals is increased when observed coherently and measured in the context of prior sequences, yielding an extended overall sequence and finer frequency resolution.

Holographic radar irradiates EM scatterers within a wide volume of airspace at known and coherent pulse intervals; dividing the airspace into specified spatial cells resolved in range and direction, and maintaining continuity of complex target signal information; avoiding discontinuities and dis-association in target data; and maintaining sensitivity to target information over the full range of amplitudes. The system is operable to maintain sensitivity to targets at high accelerations; and to report spatial content at times and locations with specified sensitivity, yielding target classifications including, for example, one or more of scattering cross-section and variability, velocity, dynamic trajectory, and/or rotating parts.

Holographic radar makes use of the large information set encoded and received as radar signals scattered from objects during their trajectories within the radar's VoR. The system persistently processes signal data representing the VoR. Beneficially, it avoids the conditionality of amplitude threshold-based detection and the discontinuity between pre-detection and post-detection processes that is a feature of conventional radar designs. The signals are distributed between multiple amplitude partitions, and the system supports highly-parallel and high-speed, linear signal and data processing available, for example, from gate arrays and graphics processors. It maintains the detail and precision of stored signal information from reception to reporting.

A vector histogram (VH) format (or 'source-referenced histogram' format) is used to store data corresponding to the received signals. In the vector histogram format, in addition to a measure of the amplitude distribution, associations are maintained between data corresponding to the frequency of the received signals (e.g. Doppler indices) or their time indices, and their amplitudes, among other parameters. Time and Doppler frequency indices are used to efficiently address and access the stored data. In a particularly advantageous example, the amplitude values are compressed to enable efficient storage of the data in the vector histogram format. Advantageously, compared to storing the data in a simple conventional histogram, the vector histogram format allows for more efficient and more detailed analysis of the stored data. The VH data format enables radar functions that would otherwise require comprehensive conditional processes (i.e. multiple detection threshold-based processes), resulting in volatile and inefficient use of high-speed parallel processors.

Methods of the present disclosure (a) support target classification including the analysis of low-amplitude target signature characteristics, (b) retain sensitivity in the presence of target dynamics, and (c) support discrimination and suppression of repetitive clutter and of multipath targets, as part of non-conditional, parallel cell data processing.

Beneficially, in the radar system of the present disclosure, the single amplitude threshold test of target signals is replaced by a non-conditional process of multi-level signal amplitude partitioning into the VH format. This leads to the discovery of cells in which target information beyond presence and position can be extracted, while making more efficient use of high capacity, parallel processing devices.

A fully holographic radar has the ability to analyse signals without the volatility of data-dependent conditional process demands. Each cell returning enhanced signal energy may be registered as a Candidate Cell.

In the case of Newtonian target dynamics, acceleration during a coherent processing interval spreads signal energy between multiple contiguous and phase-correlated but lower-amplitude Doppler frequency components.

Many air targets exhibit Doppler spectrum spurs at reduced amplitudes (that may otherwise be discarded in conventional threshold-based detection) that arise from components such as rotors and propellers.

In the case of multipath returns, as described in more detail below with reference to FIG. 13, pairs of lower-amplitude but synchronous, coherent returns are formed in association with a higher-amplitude target, at identical ranges but further than that of the target itself, and at identical Doppler shifts, but in separate directions; one appears towards the target, the other towards the multipath reflector, and either may be detected in error as an isolated target.

Holographic radar addresses these specific challenges of target dynamics, Doppler signature and modulation spurs, target classification and multipath returns through its capacity to partition without explicit data-conditional tests and to correlate coherent radar return sequences.

Each resolution cell is submitted for classification based on its corresponding signal content. Exemplary signal aspects and associated features, and corresponding classifications, are listed in the table of FIG. 5. The holographic radar of the present disclosure uses a method of parallel data partitioning, analysis and reporting, to perform these complex classifications.

The Holographic Radar uses a non-conditional signal amplitude partitioning process. The data set is separated into fractions based directly on decisions implicit within the process of digitization and processing, rather than additional explicit tests during analysis.

A vector histogram provides a way of sorting digital signal data vectors into amplitude-partitioned segments, retaining direct reference to source indices and values including signal times, frequencies, radial speeds, phases, complex amplitudes and target references including classification and trajectory parameters.

The process for each resolution cell or each array element takes as its input the series of complex signal amplitudes as indexed functions of either time or frequency, typically expressed as 32-bit floating-point numbers.

The conventional explicit threshold tests for each indexed value, selecting each signal index between binary 'pass/fail' classes, is replaced by amplitude compression and transposition of the data into a vector histogram (for example, by translating each data element into a memory array, or the like, to form the vector histogram). In this example a square root function and a fixed lookup table are used, prior to partitioning amplitudes between multiple integer indices. However, it will be appreciated that the amplitude compression need not necessarily be achieved using a square root function, and that any other suitable function (for example a cube root or logarithmic function) may be used. Conversion from 32-bit floating-point to 8-bit integers reduces the number of amplitude indices. Many other forms of compression and indexing are available. The compression and encoding procedure enables a method of partitioning the signal values that closely associates neighbouring signal components thereby benefiting the usable signal to noise ratio.

In encoding the series of signal amplitudes, each time or frequency index yields a compressed amplitude code. The amplitude code is transposed as an address (in this case an 8-bit address) into a set of memory arrays, each element storing a vector of at least two numbers. In the simplest case for a vector histogram, these numbers are the increasing histogram ordinate of occurrences at that amplitude address and the source time or frequency index itself. The phase, the 32-bit amplitude or other cell or target parameters may be added, as described below. The compression, transposition and storage retains the signal reference and its amplitude distribution.

In greater detail, an example of a vector histogram is constructed for a time series of complex amplitudes A (t) or a Doppler spectrum A (f) representing a pulse sequence at each array channel or a Doppler spectrum at each array channel or a pulse sequence at each resolution cell or a Doppler spectrum at each resolution cell. Signal amplitudes are addressed by the time (t) or Doppler frequency index (f). Amplitudes expressed linearly and digitally, for example as 32-bit numbers, are compressed (for example as square roots, cube roots including bipolar values, or logarithms).

A series of N contiguous amplitude bins indexed $AI_T(1:N)$ or $AI_F(1:N)$ is defined, dividing the compressed amplitude range into bins. Each 32-bit amplitude is represented in this example by an 8-bit amplitude bin index.

Taking the frequency domain case, a Frequency Domain Vector Histogram (FDVH) is formed in sequence from the frequency-indexed integer amplitude series $AI_F(f)$. For each frequency index its integer compressed-amplitude bin index is transposed as the FDVH abscissa address. The indexed ordinate FDVH ($AI_F(f),n$) is incremented and stored with the frequency index at VH($AI_F(f),n+1$) as a 2-element vector. The frequency and the scalar or complex amplitude may also be saved in a 3- to 6-element vector at that abscissa/ordinate location.

The time domain case operates in a similar way, storing information in TDVH location TDVH($AI_T(t),n+1$).

Amplitude compression is beneficial in terms of the required data capacity. For data consisting of 2048 samples at 32-bit digital resolution, the dataset immediately arising from this transposition would require a volume of $2^{32}$ abscissa locations, or 4.3 billion locations, each containing up to 2048 2-Byte numbers, for a total of 18 TB, for every resolution cell. For each cell, all but 2048 locations would be unoccupied. As an example, with amplitude compression and 8-bit integer conversion the number of locations per resolution cell is reduced from 18 TB to 256×4096=1 MB.

Illustrative Examples of Classification Methods

Illustrative examples of cell classification will now be described in more detail.

Target Modulation Spurs

Figure 6A:
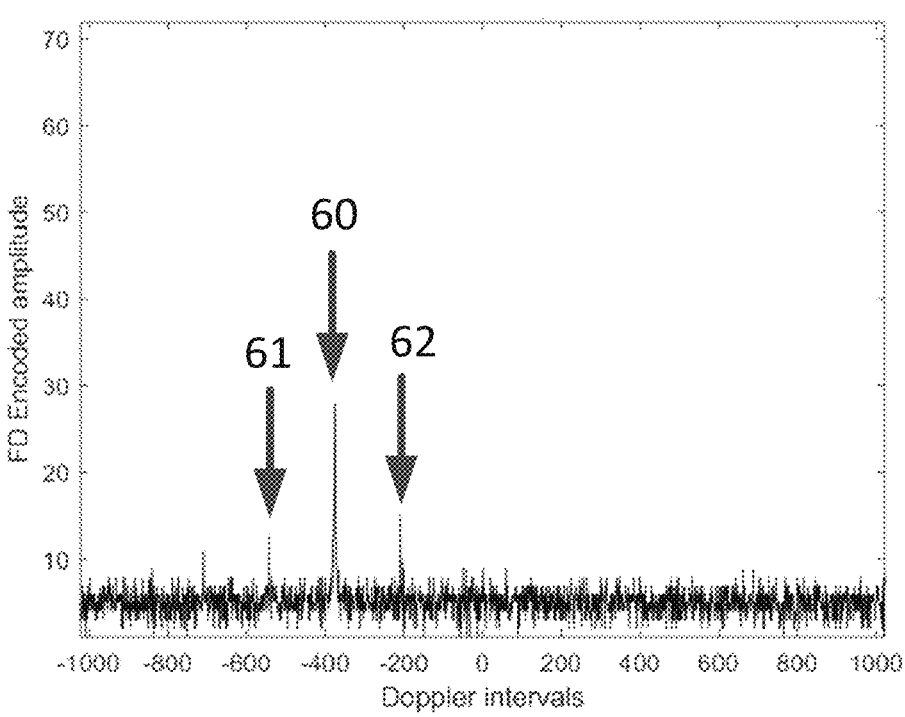
FIGS. 6a and 6b show an encoded amplitude spectrum, and a corresponding histogram in the frequency domain, respectively.
Figure 6B:
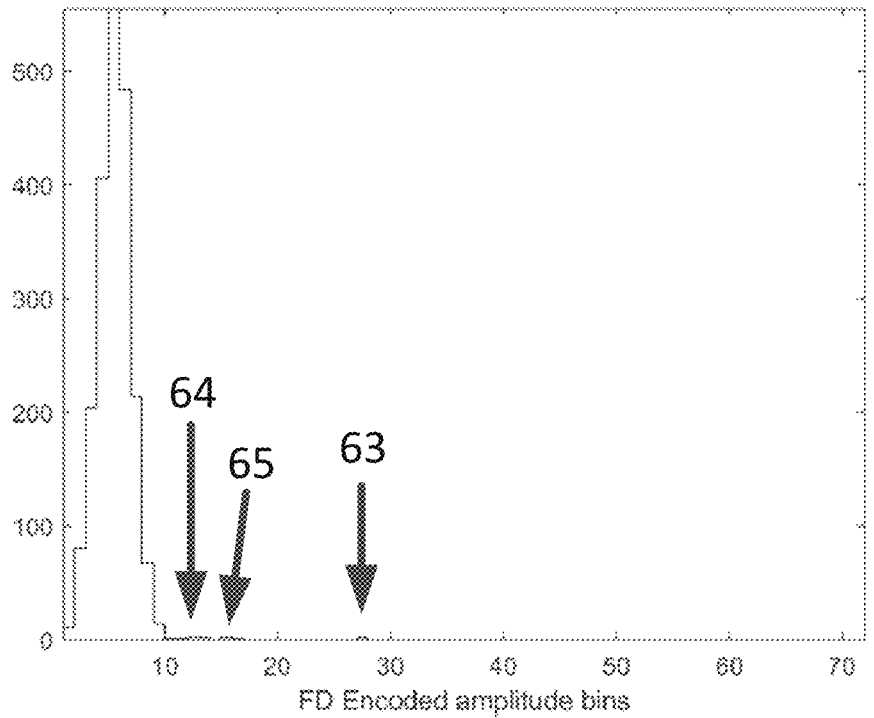

Many airborne targets include physical features such as rotating propellers and blades or helicopter rotors that produce regularly-repetitive modulations within the overall scattered signal. These offer the potential of supporting specific aspects of classification. Their scattering cross-section is generally less than that of the airframe, but their presence can be inferred from signals with spectral spurs of lower amplitude (which risk being discarded in conventional threshold-based detection), that are related to their special motions and are symmetrically associated with those of the primary scatterer. Such spurs 61, 62 can be seen FIG. 6a, either side of the main peak 60 corresponding to the airframe. FIG. 6a illustrates the data series of FIG. 4a, after amplitude encoding (the y-axis now corresponds to the frequency domain (FD) encoded amplitude), showing the lower 72 of the 256 amplitude codes. FIG. 6b shows a histogram corresponding to the data of FIG. 6a. A peak 63 corresponding to the airframe return signal (60) can be seen. The peaks at amplitudes 13 (64) and 15 (65) are unremarkable in the context of the noise distribution.

Figure 7:
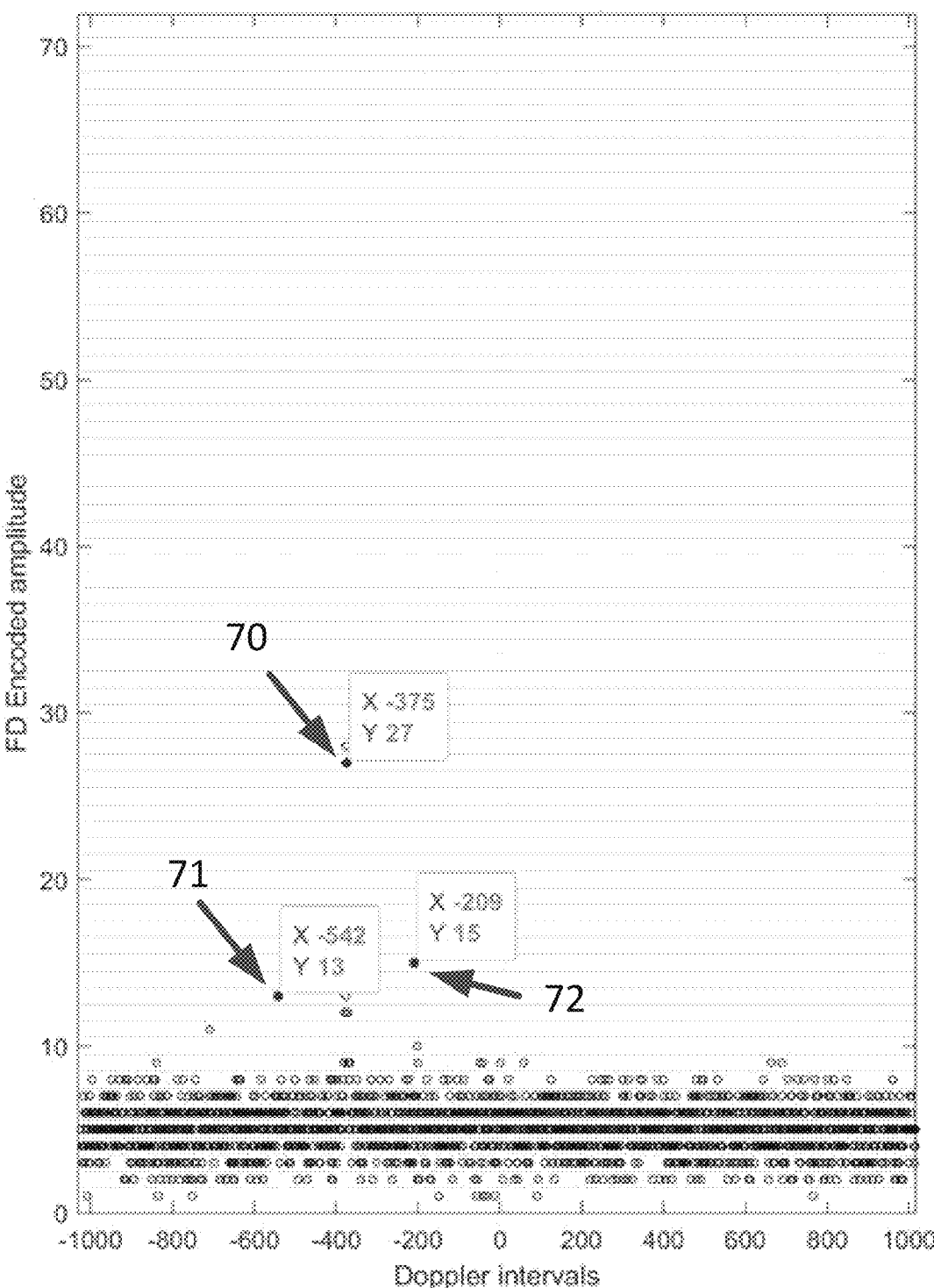
FIG. 7 shows a compressed frequency domain spectrum corresponding to the data of FIG. 6a, with Doppler indices (X) and amplitude codes (Y) shown for a target airframe and rotor spurs.

FIG. 7 illustrates the same signal values as FIG. 6a, with the amplitude ranges corresponding to the amplitude indices illustrated between horizontal lines. Doppler indices (X) and amplitude codes (Y) are shown for the target airframe 70 and rotor spurs 71, 72. Here it can be seen that the peaks at amplitudes 13 and 15 are matched within 1 Doppler bin with respect to the airframe return (+167 and −166), forming a visually-recognisable pair.

By replacing the conventional detection threshold with a vector histogram, subsequent processing for each cell can extract matches or differences between signal components in the time or the frequency domains. Modulation spurs whose displacements from the airframe component are equal and opposite to within one spectrum bin provide a simple and immediate aspect of classification. Such spurs may be used to determine, for example, the speed of rotation, the parity and the number of blades, and/or the number of engines of an aircraft.

Figure 8:
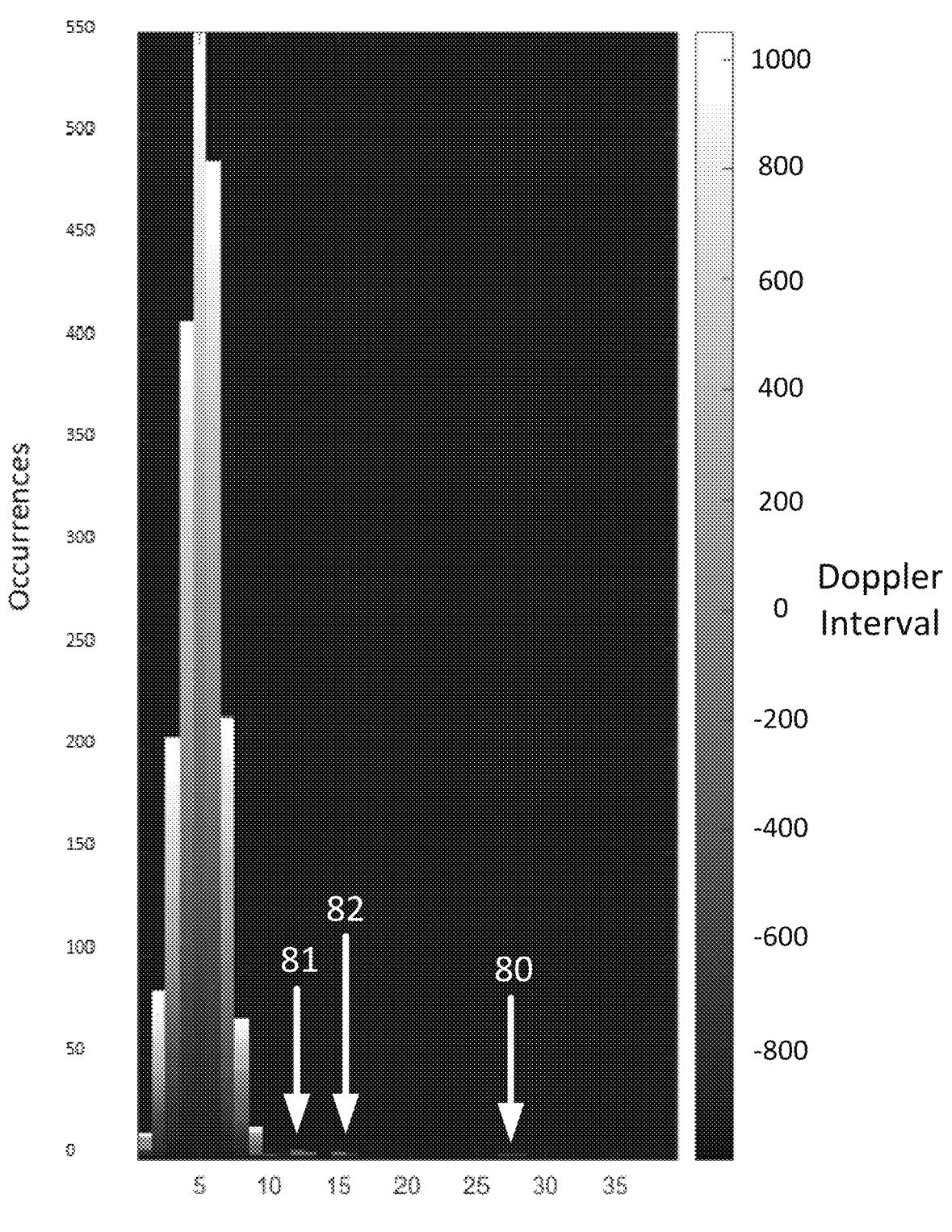
FIG. 8 shows a frequency domain vector histogram.
Figure 9:
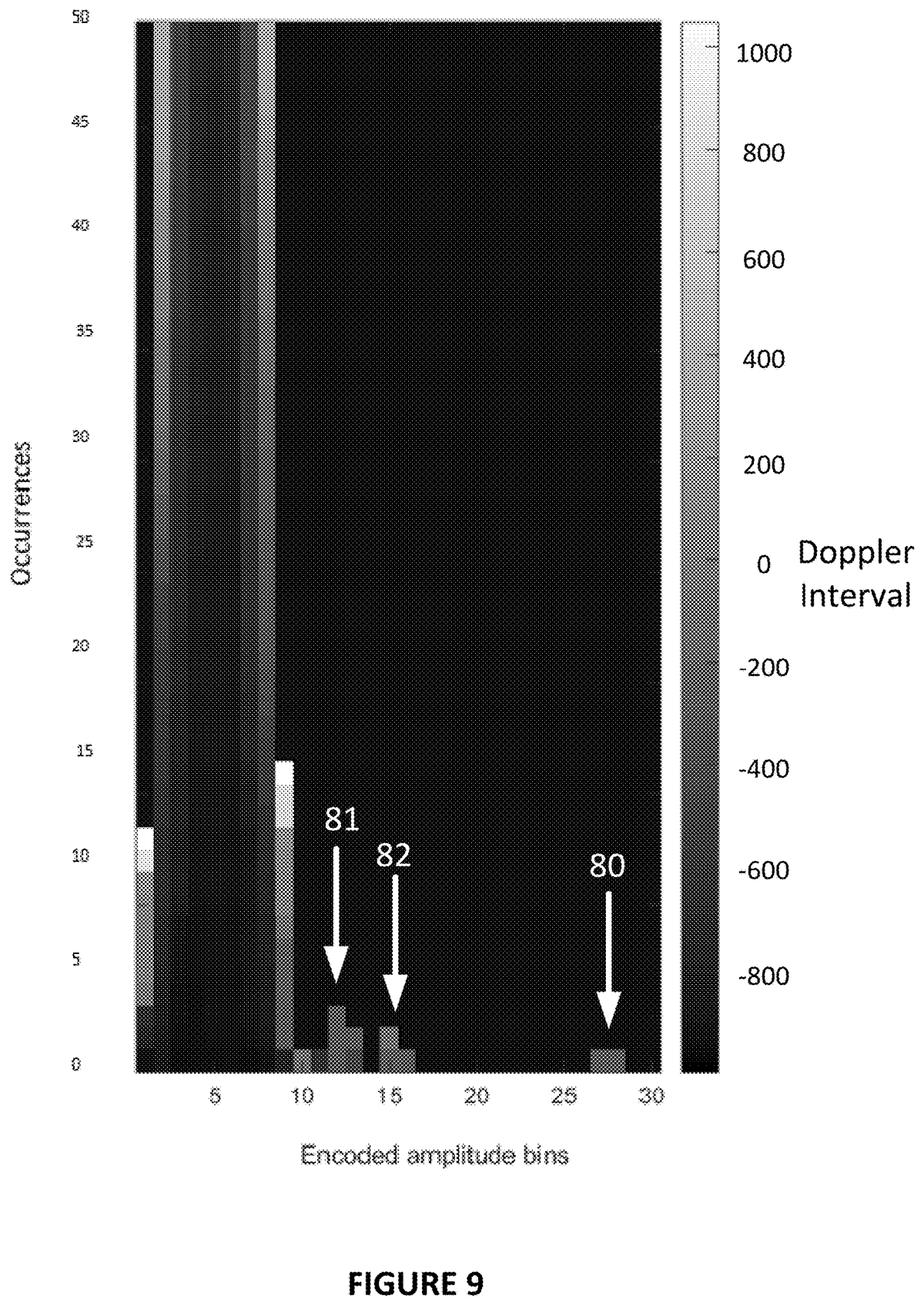

FIG. 8 shows a vector histogram in which resolved peaks at indexed amplitudes can be seen; referring directly to the amplitude and the Doppler indices, obtained without explicit threshold testing, and directly accessible for subsequent processing or control. FIG. 9 shows a more detailed view of the histogram of FIG. 8, in which the peaks corresponding to the airframe 80 and spurs 81, 82 can be seen. In this graphic representation, Doppler indices are represented by the gray code in each pixel of the figure (in contrast to a conventional histogram format, which stores only the number of occurrences corresponding to each amplitude bin). Additional data may be stored in association with each pixel, such as the Doppler frequency, radial speed, signal phase, range, azimuth and elevation positions of the relevant resolution cell and/or the 32-bit amplitude.

In this example, the abscissa values for the transposed spectrum are the lower 5 of the 8-bit integers of the compressed amplitude index. Each abscissa index may then contain up to 2048 vector ordinates containing 1 to 6 2-Byte numbers, or a total of 1 to 6 MBytes per resolution cell. With calibrated noise and anticipated signal distributions, memory volumes can be further reduced, to include the set of references or ordinates at each VH abscissa address. This association allows direct data manipulation, such as the recognition that the Doppler spur indices in this example are equally separated from the airframe peak index (+/−1) and so are directly identifiable as rotor modulations, thereby yielding the class of target. The separation of these equally-spaced spurs themselves from the airframe signal indicates directly the rate of rotation of the 2-bladed propeller:

$$\text{Rotation rate} = \text{spur seperation} \times (1/T_{cpi})/120(\text{in } r.p.m.)$$

Target Dynamics

The radial speed of a target determines the first time derivative of the phase of the received signal, which is identified with the Doppler frequency shift. The target's radial acceleration determines the second time derivative of the received phase.

Radial acceleration of the target results in changes in its Doppler shift during the dwell time. After Fourier transformation into the frequency domain, the Doppler spectrum contains signal energy spread between successive Doppler frequencies, at reduced peak amplitude values and with a phase progression, each related to the acceleration. Detection sensitivity based on the peak value is therefore degraded when using a single threshold. However, Newtonian dynamics assures information-bearing coherence between successive signal samples and Doppler components. The primary characteristic of noise within radio signals is that its complex amplitude is not correlated between samples and over time (subject to Nyquist criteria), whereas the information encoded in a signal arising from Newtonian target dynamics will be so correlated.

In a linear receiver the superposition of noise does not degrade or remodulate the underlying information. Provided that correlations exist in the signal information as provided by Newtonian motions of a scattering target, and subject to the radar power budget, appropriate filtering such as Fourier transformation can be used over time to resolve the information from among the decorrelated noise. Signals scattered by a target following Newtonian dynamics will migrate in succession between frequency bins of a Fourier transform of its scattering response, and complex amplitudes in adjacent bins vary regularly; the faster the acceleration, the lower the amplitude.

Figure 10:
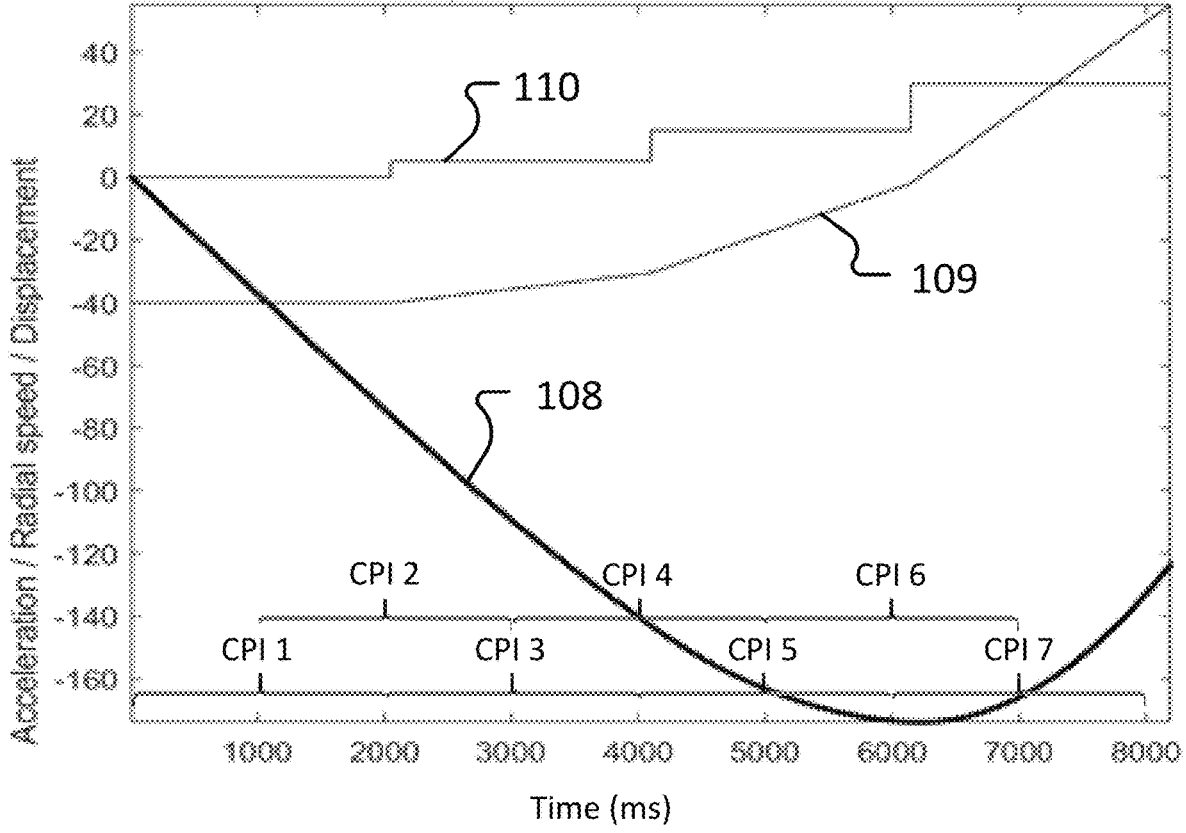
FIG. 10 shows a graph of acceleration, radial speed, and distance of a target during a manoeuvre.

FIG. 10 shows a graph corresponding to an aerial manoeuvre in which an aircraft starts at a constant radial approach speed (40 m/s) and then accelerates outwards. The graph plots the acceleration 110, radial speed 109, and distance 108 of this target during a manoeuvre. In the example the target begins on a near-tangential approach but veers away at increasing rates from OG to 0.5 G, 1.5 G and 3 G. Each acceleration stage lasts for 2 seconds. Seven partially-overlapping time regions CPI 1 to CPI7 are indicated by the brackets.

Figures 11A, 11B, 11C:
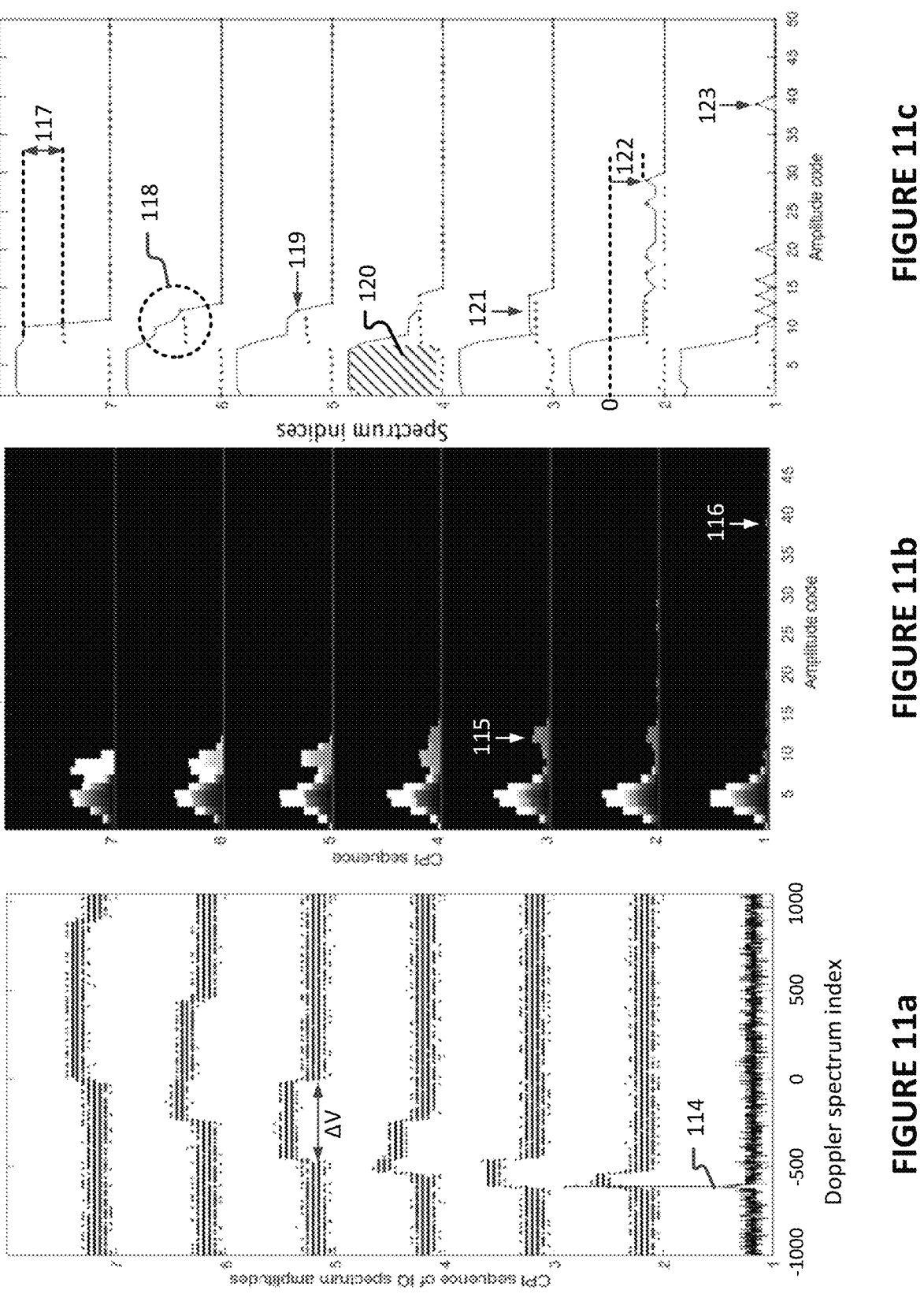
FIG. 11a shows dynamic Doppler spectra for seven stages during the manoeuvre.
FIG. 11b shows a vector histogram for the seven stages during the manoeuvre.
FIG. 11c shows graphs indicating acceleration for the seven stages during the manoeuvre.

FIGS. 11a, 11b and 11c show dynamic Doppler spectra; vector histograms and acceleration for each of the 7 time periods (coherent processing intervals—CPI) during the manoeuvre. At constant speed, the target would pass a 20 dB threshold, but would fail under acceleration due to the broadening of the target peak 114 illustrated through CPIs 2 to 7.

FIG. 11a illustrates amplitude-compressed Doppler spectra, with noise, for each section of the manoeuvre. The x-axis is the Doppler spectrum index. The signals and their Doppler shifts arising through the manoeuvre are illustrated in the 7 overlapping CPI graphs illustrated in FIG. 11a. As illustrated in FIG. 10, CPI 1 corresponds to a period of constant radial speed; the 0.5 G acceleration begins during CPI 2, and is completed in CPI 4. The 1.5 G acceleration begins in CPI 4 and is completed in CPI 6. CPI 6 includes the start of the 3 G acceleration, which ends in CPI 7. The result at zero acceleration is illustrated by a solid line graph at 114 in FIG. 11a; the other data are shown as dotted lines to illustrate the amplitude compression indices. During this sequence, the target Doppler peak broadens from a single Doppler bin through widths of 60, 120, 240, 360, 600 and 800 bins, which are then directly accessible from the vector histogram over a range of amplitudes.

Total signal plus noise energy for the 7 sections of the measurement are, in relative terms:

$$E_{noise} = 250; E_{sig} = 1140, 1152, 1168, 1171, 1157, 1175, 1191$$

Signal energy in this case is conserved within +/−0.2 dB as the acceleration increases. This supports signal energy-based active cell registration (listed in the table of FIG. 5).

For operating frequency Fc and coherent dwell time $T_{cpi}$ the radial speed is related to the spectrum index $Sp_{index}$ (for a 2048-point spectrum) by:

$$Vr = (Sp_{index} - 1024) \times Vc/(2 \times Fc \times T_{cpi})$$

where Vc is the speed of light.

The spectrum index varies as the target accelerates. Acceleration during the dwell time is indicated by the width of the target spectrum above the noise level. Doppler signal amplitude is inversely related to the instantaneous rate of acceleration.

FIG. 11b shows the Vector Histograms for the seven CPI of the manoeuvre. At OG the target peak 116 is indicated near amplitude 40, and its approaching Doppler index is encoded in the figure as a dark grey colour code.

FIG. 11c illustrates some exemplary indicators that can be derived directly from the data stored in the Vector Histogram. The graphs of FIG. 11c illustrate the high-resolution spectral indices within each amplitude segment and are directly available from the Vector Histogram. The y-axis of each of the graphs shown in FIG. 11c is the Doppler spectrum index (between −1024 and 1023). The dotted lines shown in FIG. 11c represent the minimum spectrum index at the corresponding amplitude index for each CPI. The solid lines represent the maximum spectrum index at the corresponding amplitude index. It will be appreciated, therefore, that the difference between each dotted line and the corresponding solid line at a given amplitude code in FIG. 11c represents the difference between the maximum spectrum index and the minimum spectrum index at a given amplitude. This difference, above the noise distribution region (indicated by the diagonally shaded region 120), indicates acceleration during the CPI. For example, the difference indicated by arrow 117 indicates acceleration during CPI 7. The spread of the Doppler spectrum within the range of target amplitudes, divided by the CPI duration (amplitude bin 10), corresponds to acceleration:

$$Acceleration = (End\ speed - Start\ speed)/CPI\ duration$$

Alternative Vector Histogram-based techniques can exploit correlations between the phases of successive spectrum components.

The mean value of the dotted line and the solid line at a given amplitude code is a measure of the mean radial speed. For example, the mean value indicated by arrow 122 (which extends downwards from 0 on the y-axis) is a measure of the mean radial speed in CPI 2. The mean radial speed is calculated using an amplitude-weighted mean of the Doppler spectrum for the range of target speeds.

Region 118 in CPI 6 indicated by the dashed circle indicates target dynamics detail. Arrow 119 in CPI 5 corresponds to the amplitude-weighted mean radial speed. The region indicated by arrow 121 in CPI 3, and the peak indicated by arrow 123 in CPI 1, corresponds to the target return.

It will be appreciated that there are various different methods of estimating outputs using the data stored in the vector histogram, the methods having varying sensitivities and computational loads.

Amplitude compression yields a noise amplitude distribution with a narrowly-defined upper boundary; in this example, thermal and circuit noise occupy the lower 7 amplitude bins of the VH of FIG. 11b. At constant radial speed (CPI 1), the target data extends from bin 8 (above which the effects of noise are insignificant) to bin 39. Acceleration extends the distribution in frequency; for outward acceleration the upper Doppler index is extended. Newtonian accelerating targets do not bypass Doppler bins, and an accelerating spectrum feature contains no gaps except by noise cancellation or deep target fading.

Broadcast Interference

Figure 12B:
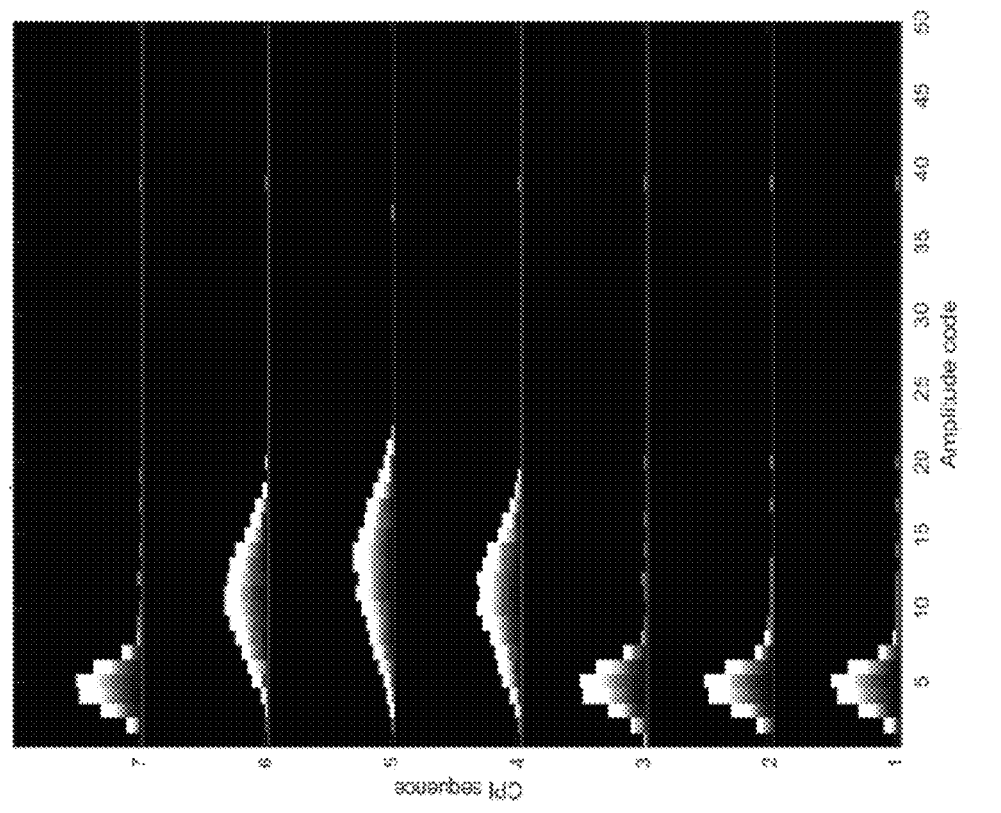
FIGS. 12a and 12b show Doppler spectra and corresponding vector histograms, respectively, illustrating the effect of increased noise during the third quarter of the manoeuvre.
Figure 12A:
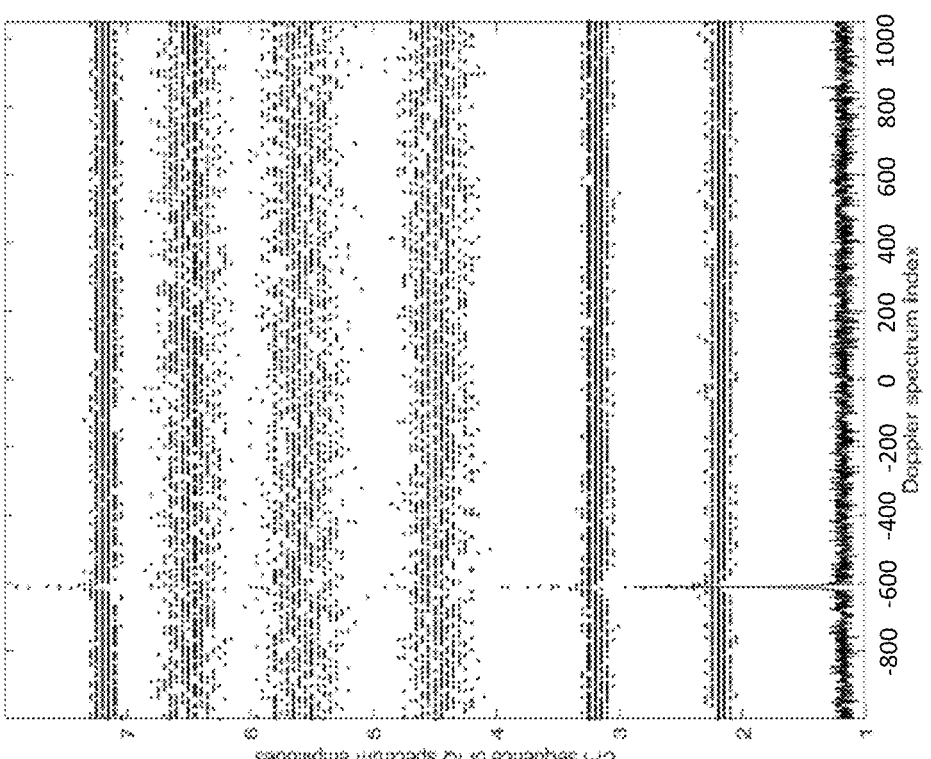

For comparison, broadband and time-varying interference, illustrated in FIGS. 12*a* and 12*b*, also results in broad spreading of the cell spectrum, which under that condition extends close to the spectrum bounds. These graphs illustrate the effect of increased noise during the third quarter of the manoeuvre (CPI 5). Noise spectra set the width of the distribution in the vector histogram, and the gray codes (corresponding to the Doppler index) are evenly spread with amplitude in the case of persistent or time-varying random interference.

The vector histogram provides an efficient basis for detection and target analysis. Storage and linear analysis of the sequence of complex amplitudes in the VH allows sensitivity to be maintained and the average speed of approach and radial acceleration to be measured.

Target Satellite Returns

Figure 13:
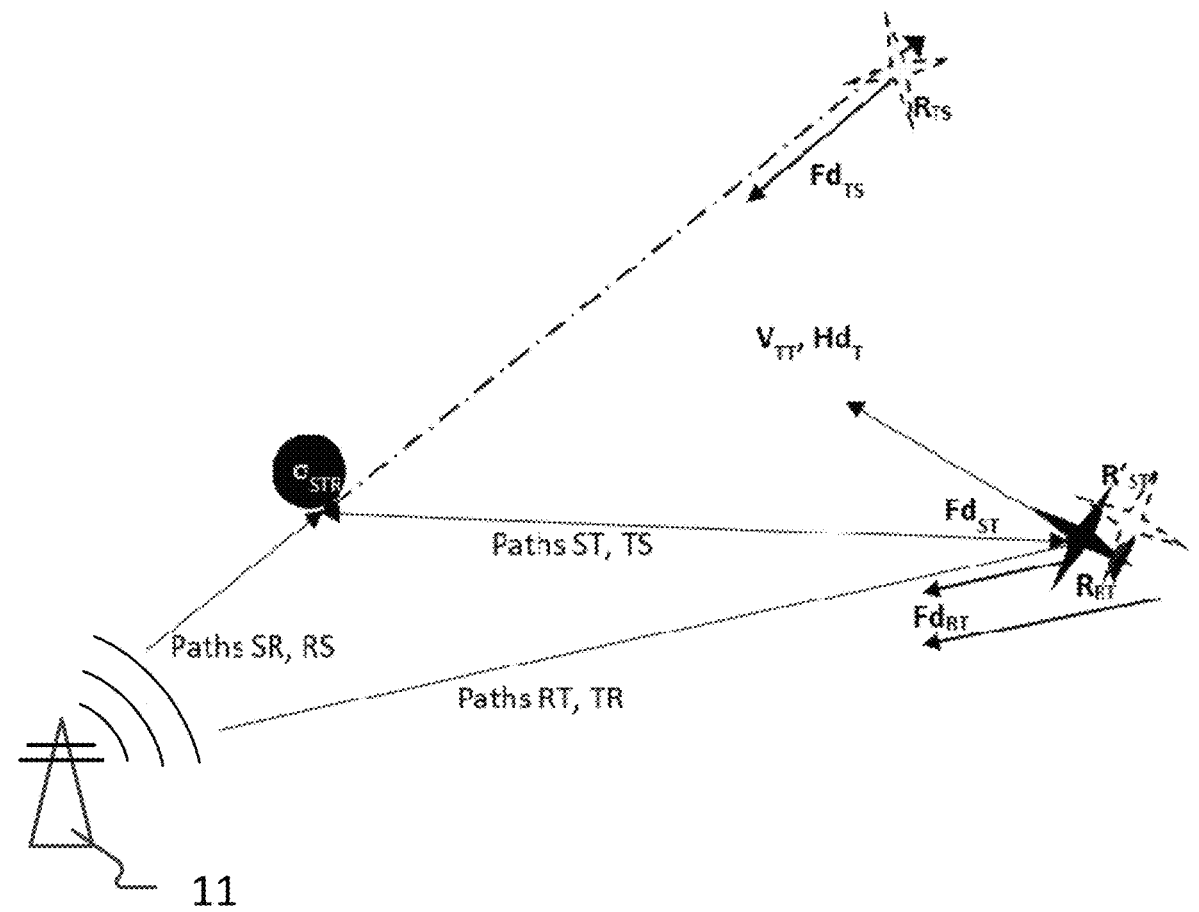
FIG. 13 shows a simplified schematic illustration of satellite radar returns from a target in the presence of multipath scattering.

Holographic radar also provides a method of classifying Target Satellite Returns (TSR) which arise from propagation as illustrated in FIG. 13. This shows satellite radar returns (ST, TS) from target RT in the presence of multipath scattering, which contain clutter information that may then be reported or suppressed.

When multipath reflections occur from clutter either in the neighbourhood of the target or of the radar, two secondary satellites arise. They exhibit lower amplitudes and greater apparent range than the primary target. Reflection occurs both during transmission from radar to target or after scattering from target on the path back to the radar. Secondary satellites appear at exactly the same range, extended beyond the target range, and at the same Doppler offset from that of the target. One ('ST') appears in the target direction and one ('TS') in the clutter scattering direction.

A tertiary satellite arises when the clutter reflection occurs both on the transmit and the receive paths, appearing at twice the range extension, at twice the Doppler offset, in the direction of the second satellite (not the target direction) and is doubly reduced in amplitude.

The method of the present disclosure provides that all Vector Histograms are generated, after which it allows any lower-amplitude secondary and tertiary satellite signals to be identified and suppressed. This is in contrast to the simple conventional single detection threshold, which can result in lower amplitude data being discarded or interpreted as an additional target of interest. The direction of the multipath reflector can be identified once the satellites are matched.

On capturing a qualifying target a precautionary cell search is made at the same range and nearby azimuths for a target at the same amplitude and exactly matched range and Doppler ($R_{ST}=R_{TS}$, $Fd_{ST}=Fd_{TS}$), one of which is at the same azimuth as a previously-captured target. This utilises a comparison between vector histograms for neighbouring resolution cells, but is facilitated by the non-conditional partitioning of signal amplitudes within each when seeking close matches in the range/Doppler surfaces and avoiding a false threshold pass by only one of two satellites.

If such a pair is present and one of the pair is associated with a target at shorter range, in the same direction and at higher amplitude ($R_{RT}>R_{ST}$, $R_{TS}$, $AZ_{ST}=AZ_{RT}$, $A_{RT}>A_{ST}=A_{TS}$), these are identifiable as a pair of secondary satellite returns. The scatter source will be in the direction of the alternate candidate. The higher-amplitude candidate target progresses as a target and the two satellites are discarded. A third satellite in the same direction as the item of clutter and exactly twice the range extension and exactly twice the Doppler difference can also be suppressed.

To identify satellites, the following five rules hold:
1: $R_{TS}>R_{RT}$;
2: $R'_{TS}==R'_{ST}$
3: $F_{DTS}==F_{DST}$
4: $A_{RT}>A_{TS}$, $A_{ST}$
5: $AZ_{ST}=AZ_{TR}$ Assessment of Repetitive Clutter Signals A time-domain version of the Vector Histogram (TDVH), applied to resolution cells affected by repetitive clutter such as wind turbine blades, is able to give direct derivations of the timing and amplitude of clutter returns. This is a key function for implementations of procedures for suppression of wind turbine clutter.

Figures 14A, 14B:
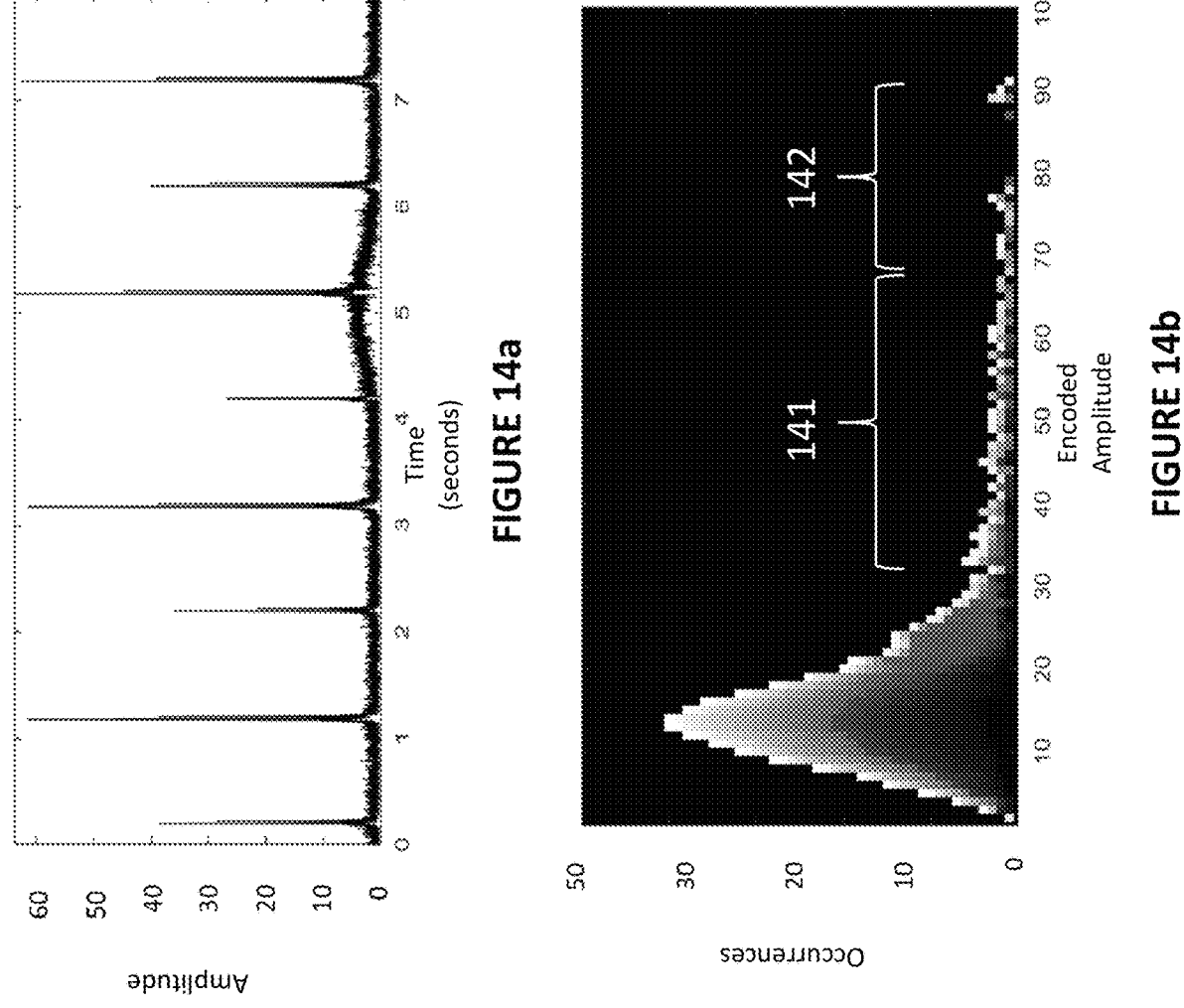
FIGS. 14a and 14b show a graph illustrating a time series of wind turbine blade flashes and an associated vector histogram, respectively.

A series of wind turbine blade flashes are modelled in FIG. 14*a*, which shows time series of the wind turbine flashes. The associated vector histogram in shown in FIG. 14*b*. The gray scale of FIG. 14*b* represents the corresponding time indices. Region 141 corresponds to approach and recede flashes, and region 142 corresponds to (typically higher-amplitude) approach flashes only. The gray-scale coding of time indices in the TDVH illustrates that while noise yields smoothly-varying gray codes, the codes associated with approaching and receding blades are discontinuous. The timing of clutter peaks can be derived directly from the time indices associated with the amplitude peaks.

Illustrative Visual Representation

Figure 15:
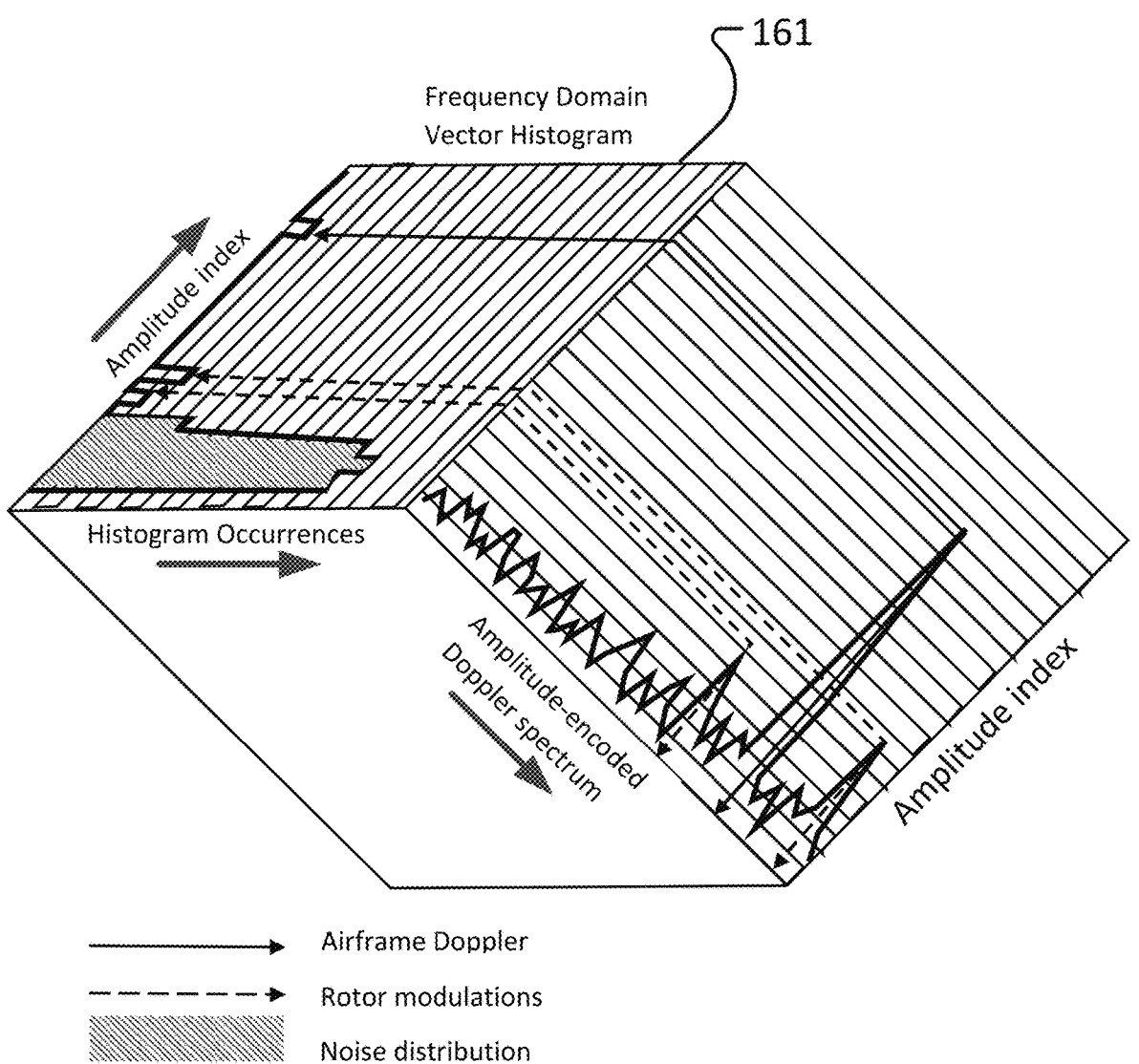
FIG. 15 shows a visual representation of a vector histogram format.

FIG. 15 shows a schematic visual representation (in the form of a 3D cube) of the association between the signal/target parameters that is retained in the vector histogram format. The low amplitude noise region (indicated by the shading) is shown in the histogram on the upper left face. The frequency indices in the low-amplitude region are associated with amplitude indices representing the large numbers of occurrences in the noise, similarly to FIG. 8. The remaining three occurrences are associated with and store the frequency indices of the airframe and corresponding rotor spurs. The mapping between the target peak (airframe) and the corresponding peak in the amplitude spectrum is indicated by the solid line. The mapping between the corresponding rotor spurs is indicated by the dashed lines.

Control Unit

Figure 16:
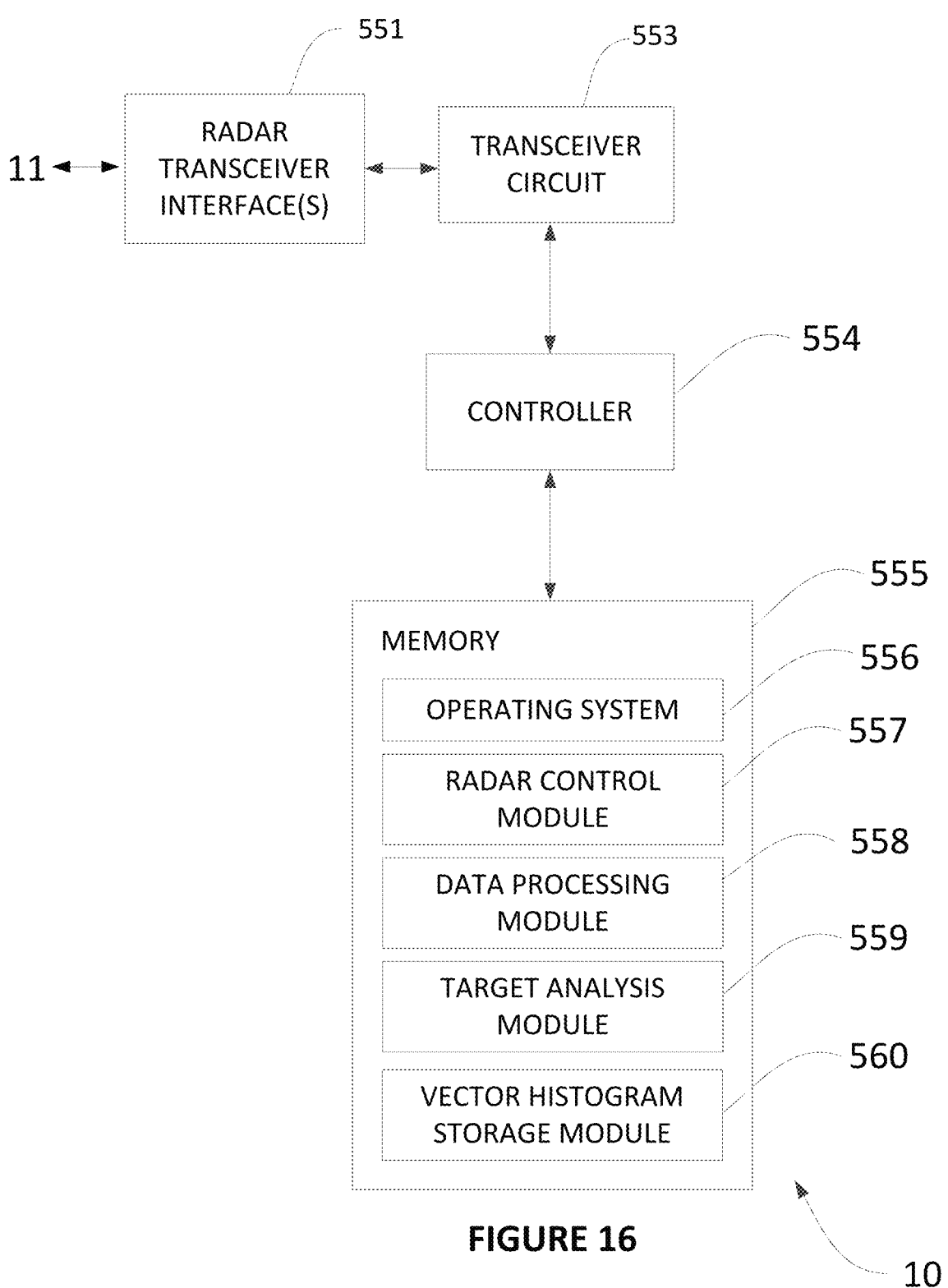
FIG. 16 shows a simplified schematic diagram of a control unit.

The control unit will now be described in more detail, by way of example only, with reference to FIG. 16.

The control unit 10 comprises at least one radar transceiver interface 551, a transceiver circuit 553, a controller 554 and memory 555.

Software stored in the memory 555 includes, among other things, an operating system 556, a radar control module 557, a data processing module 558, a target analysis module 559, and a vector histogram storage module 560. It will be appreciated that whilst, for ease of understanding, the controller 554 is described as operating under the control of a number of discrete software modules, the functionality attributed to these modules may be built into the overall operating system 556 or as separate code in such a way that the modules may not be discernible as discrete entities.

The transceiver circuit 553 is operable to transmit signals to, and to receive signals from, the transmitter(s) and receiver(s) of the radar system via the radar transceiver interface 551. The operation of the transceiver circuit 553 is controlled by the controller 554 in accordance with the software stored in the memory 555.

The radar control module 557 controls the transmitter(s) of the radar system to illuminate the volume of regard. The radar control module 557 also controls communication with the receiver(s) of the radar system, for example to receive signals reflected from potential targets of interest.

The data processing module 558 processes the received signal data. This processing includes generating the vector histogram(s) described in detail above. The generated vector histogram(s) are stored in the vector histogram storage module 560.

The target analysis module 559 identifies (and classifies) objects that are present in the volume of regard. For example, the target analysis module 559 may access the information stored in the vector histograms to classify a detected target, as described in detail above. The target analysis module 559 may use the data stored in the vector histogram(s) to perform, for example, any of the classification types listed in the table of FIG. 5.

Whilst the radar control module 557, the data processing module 558, target analysis module 559 and vector histogram storage module 560 have been described for clarity as separate modules in the present example, the skilled person will appreciate that the functions of these modules may be performed by a single combined module. In other words, an integrated process may be used in which the radar control, data processing, target analysis and vector histogram storage is not separated into separate software modules.

SUMMARY

The vector histogram data format and structure, and the corresponding data repartitioning or transposition, beneficially enables radar functions that would otherwise require multiple conditional processes, and avoids the volatile processing loads caused by simple conventional detection thresholds that result in inefficient use of high-speed parallel machines.

Modifications and Alternatives

An exemplary radar system and associated apparatus and methods have been described above in detail. As those skilled in the art will appreciate, a number of modifications and alternatives can be made to the above examples and variations whilst still benefiting from the inventions embodied therein.

In the above description, the control unit 10 is described for ease of understanding as having a number of discrete software modules. However, it will be appreciated that the functionality performed by part or all of the software may be performed using one or more dedicated hardware circuits for example using one or more dedicated integrated circuits such as an application specific integrated circuit (ASIC) or the like. The use of software modules is, nevertheless, preferred as it facilitates the updating of the system.

It will be appreciated that the controller 554 referred to in the description of the control unit 10 may comprise any suitable controller such as, for example an analogue or digital controller. Each controller may comprise any suitable form of processing circuitry including (but not limited to), for example: one or more hardware implemented computer processors; microprocessors; central processing units (CPUs); graphics processing units (GPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

It will be appreciated that for each position (e.g., 'pixel' or 'voxel') in the cube shown in FIG. 15 various information may be stored. For example, an associated time, frequency, phase, complex amplitude, radial speed, radar cross-section and/or acceleration may be stored. Storing associated data in this way allows for efficient addressing of the data and direct data manipulation, for example to identify Doppler spur indices that are equally separated from an airframe peak index.

Various other modifications will be apparent to those skilled in the art and will not be described in further detail here.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

The invention claimed is:

1. A radar system for providing surveillance, the radar system comprising:

at least one radar transmitter and at least one radar receiver arranged to provide a volume of radar coverage, wherein the at least one radar transmitter is configured to transmit a sequence of pulses to illuminate the volume of radar coverage, wherein the at least one radar receiver is configured to receive corresponding return signals reflected from within each resolution cell of one or more resolution cells within the volume of radar coverage, and wherein the return signals for each resolution cell are received in a series of coherent processing intervals; and means for processing the return signals, wherein the means for processing the return signals is configured to:

extract characteristics from each return signal of a plurality of return signals received in each resolution cell in each coherent processing interval of a plurality of coherent processing intervals, the extracted characteristics comprising a set of frequencies and/or a set of times, each frequency and/or time having a respective extracted amplitude within a corresponding amplitude range;

determine a corresponding amplitude index for the amplitude range within which the extracted amplitude falls;

for each extracted amplitude:

respectively store, in a memory location addressable via the corresponding amplitude index, a set of return signal related data comprising information for identifying the corresponding frequency and/or time, and an associated identifier for uniquely identifying, in combination with the amplitude index, that set of return signal related data; and extract a further characteristic including at least one of a position, heading, speed, acceleration, altitude, scattering cross-section, and/or classification of an object within the volume of radar coverage based on the stored set of return signal related data.

2. The radar system according to claim 1, wherein the associated identifier is an integer that is incremented for each successive set of return signal related data stored in association with the corresponding amplitude index.

3. The radar system according to claim 1, wherein the means for processing the return signals is further configured to access a stored set of return signal related data by using the corresponding amplitude index as at least part of an address, and optionally the associated identifier for uniquely identifying the set of return signal related data as part of the address.

4. The radar system according to claim 1, wherein the extracted characteristics comprise one or more of the set of frequencies and the extracted amplitudes comprise one or more of the corresponding amplitudes in the frequency domain.

5. The radar system according to claim 1, wherein the extracted characteristics comprise one or more of the set of times and the set of extracted amplitudes comprises one or more of the corresponding amplitudes in the time domain.

6. The radar system according to claim 1, wherein the at least one radar transmitter is configured to transmit the sequence of pulses omnidirectionally.

7. The radar system according to claim 1, wherein the amplitude index, the set of return signal related data, and the associated identifier for uniquely identifying, in combination with the amplitude index, the set of return signal related data are stored in association with one another in a vector histogram.

8. The radar system according to claim 1, wherein the set of return signal related data comprises at least one of an associated time, frequency, phase, complex amplitude, radial speed, and/or acceleration.

9. The radar system according to claim 1, wherein the set of return signal related data is stored as a vector that is identifiable using the corresponding amplitude index, and optionally the associated identifier for uniquely identifying, in combination with the amplitude index, the set of return signal related data.

10. The radar system according to claim 1, wherein the means for processing the return signals is further configured to update the stored set of return signal related data to include the extracted further characteristic.

11. The radar system according to claim 1, wherein the object is a target in the volume of radar coverage.

12. The radar system according to claim 1, wherein the means for processing the return signals is further configured to identify the presence of a target within the volume of radar coverage based on the stored set of return signal related data.

13. The radar system according to claim 1, wherein the means for processing the return signals is configured for parallel processing of the return signals and/or for parallel processing of the set of return signal related data.

14. The radar system according to claim 1, wherein the volume of radar coverage comprises a plurality of resolution cells; and wherein the means for processing the return signals is configured to classify, based on the set of return signal related data, a return signal received from a cell of the plurality of cells as at least one of:

a noise signal corresponding to noise in the at least one resolution cell;

a clutter signal;

a candidate target;

a target signal corresponding to an object of interest in the volume of radar coverage;

a multipath signal corresponding to multipath scattering;

an interference signal; or a malfunction signal corresponding to a malfunction of the radar system.

15. The radar system according to claim 14, wherein the at least one radar receiver comprises a plurality of radar receiver elements and/or comprises a plurality of radar receivers; and wherein the at least one radar receiver is configurable for digital beamforming to form the plurality of resolution cells.

16. The radar system according to claim 1, wherein the means for processing the return signals is further configured for identifying a modulation spur, and/or for identifying at least one rotating component of an object comprising a rotor, propeller, jet engine, or wind turbine blade from the set of return signal related data.

17. The radar system according to claim 1, wherein the means for processing the return signals is further configured to determine an acceleration of an object from the set of return signal related data, wherein the determination is based on contiguous amplitudes in the frequency domain.

18. The radar system according to claim 1, wherein the means for processing the return signals is further configured to determine at least one of an associated range, amplitude, direction and/or Doppler offset of simultaneous and coherent received signals, to identify multipath return signals using the set of return signal related data.

19. A method of a radar system for providing surveillance, the method comprising:

transmitting a sequence of pulses to illuminate a volume of radar coverage, receiving corresponding return signals reflected from each resolution cell of one or more resolution cells within the volume of radar coverage, wherein the return signals for each resolution cell are received in a series of coherent processing intervals;

processing the return signals is configured to:

extract characteristics from each return signal of a plurality of return signals received in each resolution cell and each coherent processing interval of a plurality of coherent processing intervals, the extracted characteristics comprising a set of frequencies and/or a set of times, each frequency and/or time having a respective extracted amplitude within a corresponding amplitude range;

determine a corresponding amplitude index for the amplitude range within which the extracted amplitude falls;

for each extracted amplitude:

respectively store, in a memory location addressable via the corresponding amplitude index, a set of return signal related data comprising information for identifying corresponding frequencies and/or times, and an associated identifier for uniquely identifying, in combination with the amplitude index, that set of return signal related data; and extract a further characteristic including at least one of a position, heading, speed, acceleration, altitude, scattering cross-section, and/or classification of an object within the volume of radar coverage based on the stored set of return signal related data.

20. A non-transitory computer-readable medium storing a program including instructions that, when executed by a processor forming part of a radar system, cause the processor to carry out the steps of the method of claim 19.

* * * * *